United States Patent
Lemieux et al.

(10) Patent No.: US 7,413,198 B2
(45) Date of Patent: Aug. 19, 2008

(54) SKAG HAVING ANGLED ATTACHMENT STUDS

(75) Inventors: Rene Lemieux, Granby (CA); Yvon Bedard, Orford (CA); Bertrand Mallette, Rock-Forest (CA)

(73) Assignee: Bombardier Recreational Products Inc., Valcourt (CA)

( * ) Notice: Subject to any disclaimer, the term of this patent is extended or adjusted under 35 U.S.C. 154(b) by 66 days.

(21) Appl. No.: 11/349,256

(22) Filed: Feb. 8, 2006

(65) Prior Publication Data

US 2006/0175777 A1    Aug. 10, 2006

Related U.S. Application Data

(60) Provisional application No. 60/651,144, filed on Feb. 8, 2005.

(51) Int. Cl.
*B62B 13/00* (2006.01)

(52) U.S. Cl. .................. 280/28; 280/21.1; 280/609

(58) Field of Classification Search .............. 180/182, 180/183, 184, 185, 186, 187, 188, 189, 190; 280/21.1, 22, 25, 26, 27, 28, 29, 601, 606, 280/608, 609

See application file for complete search history.

(56) References Cited

U.S. PATENT DOCUMENTS

| 2,150,964 | A | | 3/1939 | Dornseif |
|---|---|---|---|---|
| 3,082,444 | A | | 3/1963 | Estes |
| 3,545,560 | A | | 12/1970 | Fox |
| 3,732,939 | A | | 5/1973 | Samson |
| 3,739,458 | A | | 6/1973 | Reedy et al. |
| 3,765,695 | A | | 10/1973 | McGregor |
| 3,773,343 | A | | 11/1973 | Ambrose |
| 3,857,578 | A | | 12/1974 | Alton |
| 3,964,561 | A | | 6/1976 | Lunzer et al. |
| 4,163,565 | A | | 8/1979 | Weber |
| 5,205,690 | A | * | 4/1993 | Roth ............................ 411/82 |
| 5,222,749 | A | * | 6/1993 | Bergstrom .................... 280/28 |
| 5,344,168 | A | | 9/1994 | Olson |
| 5,443,278 | A | | 8/1995 | Berto |
| 5,599,030 | A | | 2/1997 | Campbell et al. |

(Continued)

FOREIGN PATENT DOCUMENTS

EP    1375335    1/2004

OTHER PUBLICATIONS

A Prior Art Skag Sold by International Engineering & Manufacturing Inc. of Hope, Michigan under the Trademark of Woody's®.

*Primary Examiner*—Christopher Ellis
*Assistant Examiner*—John D Walters
(74) *Attorney, Agent, or Firm*—Osler, Hoskin & Harcourt LLP

(57) ABSTRACT

A skag having a rod/elongated rod and rearwardly-angled threaded studs upwardly-extending immovably from the rod. The skag adapted to be connected to the bottom of a snowmobile ski to enhance the steering capabilities the snowmobile ski. The studs being angled with respect to a longitudinal axis of the skag in a direction opposite to that of the forward travel direction of the skag to decrease the shear stress on the weld fixing the stud to the rod and providing a security against installing the skags in the wrong orientation on the bottom of the ski.

28 Claims, 12 Drawing Sheets

U.S. PATENT DOCUMENTS

| | | | |
|---|---|---|---|
| 5,853,061 A * | 12/1998 | Yamamoto et al. | 180/190 |
| 5,964,311 A * | 10/1999 | Yamamoto et al. | 180/190 |
| 6,102,413 A | 8/2000 | Khennache | |
| 6,105,979 A | 8/2000 | Desrochers | |
| 6,364,321 B1 * | 4/2002 | Steinhauser, Jr. | 280/11.18 |
| 6,513,612 B2 | 2/2003 | Moriyama et al. | |
| 6,623,017 B1 * | 9/2003 | Steinhauser, Jr. | 280/11.18 |
| 6,631,912 B2 * | 10/2003 | Metheny | 280/28 |
| 6,932,361 B2 * | 8/2005 | Steinhauser, Jr. | 280/11.18 |
| 6,971,653 B2 | 12/2005 | Takahiro | |
| 6,974,139 B2 | 12/2005 | Lund | |
| 2002/0041080 A1 | 4/2002 | Moriyama et al. | |
| 2003/0034619 A1 | 2/2003 | Bergstrom | |
| 2003/0151216 A1 | 8/2003 | Takahiko | |
| 2004/0051275 A1 | 3/2004 | Haruna et al. | |
| 2004/0160026 A1 | 8/2004 | Lund | |
| 2005/0017465 A1 | 1/2005 | Bergstrom | |

* cited by examiner

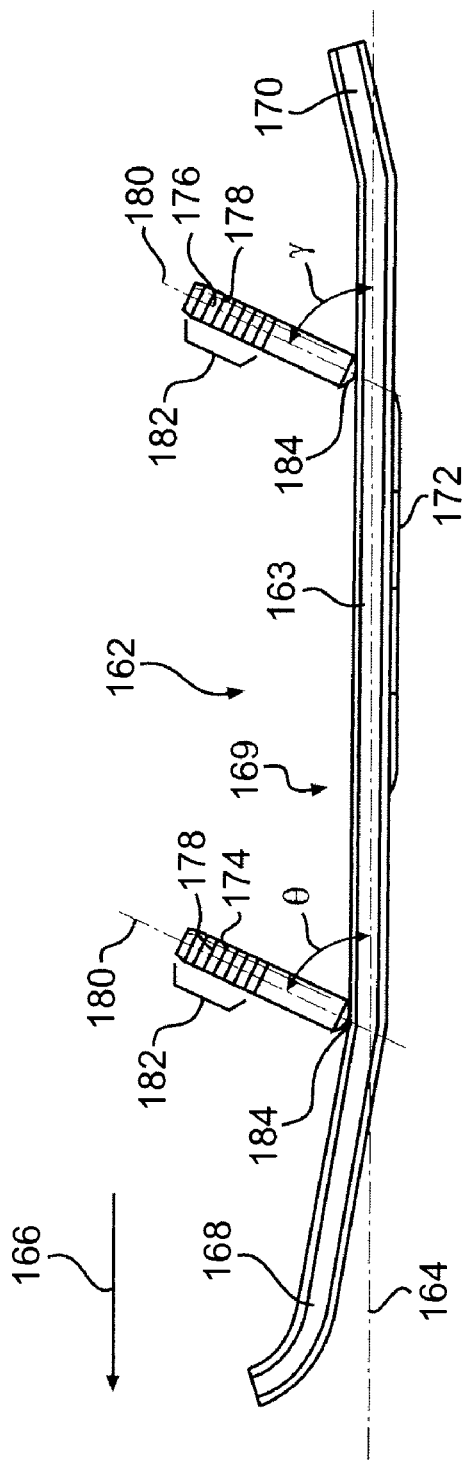
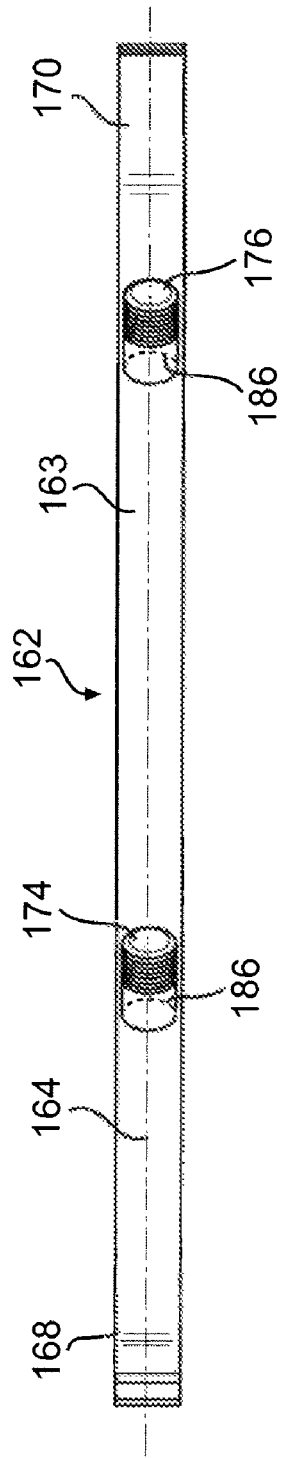

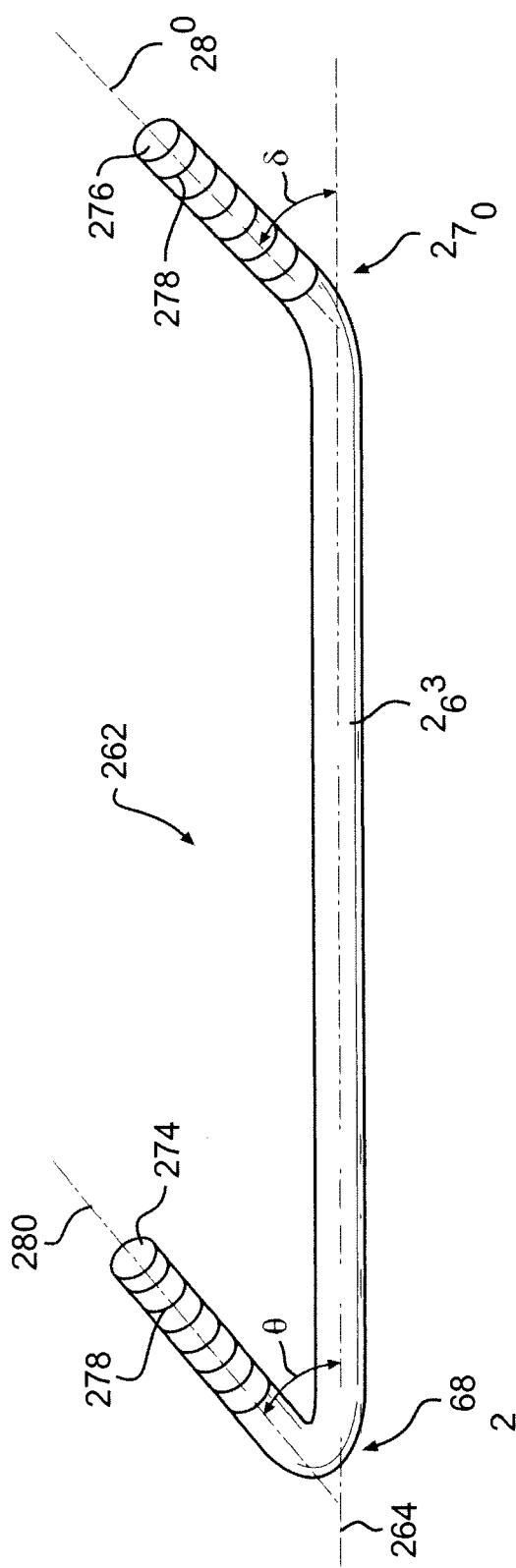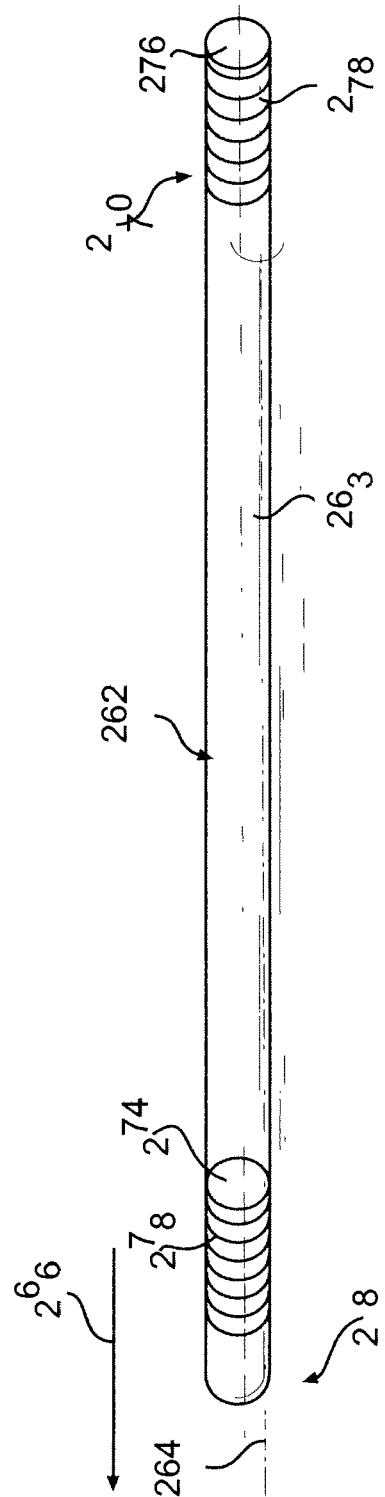

SKAG HAVING ANGLED ATTACHMENT STUDS

CROSS-REFERENCE TO RELATED APPLICATIONS

The present application claims the benefit of priority to U.S. Provisional Patent Application Ser. No. 60/651,144, filed Feb. 8, 2005, entitled "A Skag Having Angled Attachment Stud". This provisional application is incorporated by reference herein in its entirety.

FIELD OF THE INVENTION

The present invention relates to skags for snowmobile skis.

BACKGROUND OF THE PRESENT INVENTION

Snowmobile skis typically have an elongated removable steering skag (sometimes also called a wear-bar) carried on the underside (i.e. bottom surface) of the ski (and usually on the keel thereof when the underside of the ski has a keel). The skag acts to increase the bite of the ski on groomed trails, on hard-packed snow and in icy conditions when the ski is turned. The skag is also used to lengthen the life of the underside of the ski by being the contact point or wear point of the ski on the ground (as opposed the other usually plastic parts of the underside of the ski) when the ski is in contact with the ground or other hard surfaces (e.g. road surfaces).

Conventional skags are normally an elongated piece of metal such as a steel rod having a circular or square cross-section. One such prior art skag 10 is shown in FIGS. 1 and 2. This prior art skag 10 has a front 12 and a rear 14 that are normally angled slightly upwardly from a middle 16 to avoid the skag digging into the ground during use. The skag 10 is placed under the snowmobile ski such that it runs longitudinally along the underside of the snowmobile ski. In use, when the ski is travelling straight ahead, the skag 10 produces very little drag. When the ski is turned, the skag 10 is turned and creates drag over the ground surface and enhances the turning of the snowmobile. For extremely icy conditions, the bottom of the skag 10 could be equipped with one or more sharp triangular carbides 18 which further enhance the drag created between the ice and the skag 10, thus further increasing the turning capabilities of the snowmobile ski.

Conventionally, removable prior art skags such as the one shown in FIG. 1 are secured to the underside of a ski by using studs 20. Studs 20 are fixed, preferably welded, to the skag and extend upwardly away from the skag perpendicular to the longitudinal axis of the skag. The studs 20 are normally threaded to accept a nut. In most cases, a skag will be equipped with two or more longitudinally spaced studs to prevent bending of the skag when encountering side forces. To secure the skag to the underside of the ski, the studs are passed upwardly through holes in the ski and each receives a nut on the top side of the ski such that when the nut is in threaded engagement with the stud, the ski is sandwiched between the skag.

Typically, the material chosen for mass produced studs is of a high quality in order create durable threads, while that of the rod need not be of such a high quality since it is not threaded. The two materials are welded together to form the skag. However, this normally causes the welds between each stud and the rod to become the weakest point of the skag. Because the studs are attached perpendicular to the rod, the studs and particularly the welding are under shear stress when the ski is in use. Under certain circumstances, such as when the snowmobile is traversing a paved road or railroad tracks, the shear stress may be very high. The diameter of the stud and the amount of welding applied around the contact between the stud and the rod must be sufficient to withstand these high amounts of shear stress. In some cases, the shear force is nonetheless too high and the rod may be completely sheared away from the skag. This is undesirable. In other cases, the amount of material required to prevent this from occurring undesirably increases the cost of the skag.

Further, in conventional skags at least one of the studs passes through the ski close to the ski leg of the snowmobile, making access to the nut cumbersome due to its proximity to the ski leg. This makes it difficult for the skag to be removed and for a new skag to be attached.

Additionally, with the conventional construction of having the studs of a conventional skag perpendicular to the rod, there is always a possibility that the skag could be fitted to the underside of the ski in the wrong orientation (i.e. backwards) if the studs are equally spaced over the length of the rod.

Thus, while the current design of conventional skags is sufficient to provide a removable skag that enhances the turning capabilities of a snowmobile ski, there exists a need to provide an improved skag.

STATEMENT OF THE INVENTION

It is therefore an object of the present invention to provide an improved skag for a snowmobile ski that ameliorates at least one, and preferably more, of the above-noted disadvantages with conventional skags.

In one aspect, the present invention provides a skag for use on an underside of a complimentary ski for a snowmobile, the skag comprising: a rod of material having a front and rear defined consistently with a forward direction of travel of the skag when the skag is secured to the ski and the ski is connected to the snowmobile; a first stud immovably extending away from the rod of material at a first angle towards the rear of the rod of material, the first angle being less than 90°, the first stud having threads for securing the skag to the ski; and a second stud immovably extending away from the rod of material, spaced-apart from the first stud, at a second angle opening towards the rear of the rod of material, the second angle being less than 90°, the second stud having threads for securing the skag to the ski.

In another aspect, the present invention provides a skag for use on an underside of a complimentary ski for a snowmobile, the skag comprising: a rod of material having a front and rear defined consistently with a forward direction of travel of the skag when the skag is secured to the ski and the ski is connected to the snowmobile; a first stud having a first stud axis, the first stud immovably extending away from the rod of material such that when the skag is secured to the ski and the ski is connected to the snowmobile and the snowmobile is steered straight on horizontal level ground a first angle opening away from the front of the rod of material formed between a projection of the first stud axis and the ground is less than 90°; and a second stud having a second stud axis, second stud immovably extending away from the rod of material such that when the skag is secured to the ski and the ski is connected to the snowmobile and the snowmobile is steered straight on horizontal level ground a second angle opening away from the front of the rod of material formed between a projection of the second stud axis and the ground is less than 90°, the second stud being spaced-apart from the first stud.

Having the studs angled with respect to the rod as described hereinabove is believed to offer an advantage over skags of the prior art design. The primary advantage is believed to be in relation to dealing with the shear stresses created at the contact point of the rod and each stud. In this respect, due to the angles between the studs and the rod, assuming studs of a constant cross-section, the area of the contact between the studs and the rod will be greater when the studs are angled than when they are at 90°. For example, when the studs are cylindrical and the rod is rectangular, the intersection between a straight cylinder and the face of the rectangle will be a circle, whereas the intersection between an angled cylinder (having the same diameter as the straight cylinder) is an ellipse. This ellipse will have a greater diameter and area than the circle. Thus, the angled cylinder will have an increased area over which welding can occur, thus increasing the overall weld strength, thereby increasing the amount of shear force that such weld can withstand.

Moreover, the studs, in the prior art construction, were primarily (and almost totally) under a shear force when contact with the ground occurs. Whereas with the present invention, due to having the studs at angles, the forces applied to the stud and the weld are broken up into two components, a shear force and an upward force that pushes the skag into the bottom of the ski. Because the force (of a similar magnitude to that of the prior art) is now broken up into two components, the shear force experienced by the welds of skags of the present invention is decreased. Although the stud will be now subjected to a different force, it is believed that it is better to distribute the forces over all the component (i.e. the stud) as will be discussed below than have it all directed in one form to one particular area.

Depending on the construction of the skag and the ski to which the skag will be attached, some embodiments of the present invention will have additional advantages. The most common is that skags of the present invention will not be able to be incorrectly installed on the skis in the wrong direction (i.e. front of the skag towards the rear of the ski), as the complimentary holes or slots that accept them on the skis will go only from underside frontward to topside rearward. Additionally, depending on the construction and arrangement of the other topside ski components (e.g. the ski-leg, the bridge, and the handle), it may be that the angling of the studs causes the portion thereof on the topside of the ski to be easier accessed.

It should be noted that a rod of a skag of the present invention may be made of any material suitable for its intended purpose; steel is preferred. Thus, the rod need be only an enlogated body suitable for placement on the underside of the base of the ski. It need not have any particular cross-section, nor even a constant cross-section across its length (i.e. its cross-section may vary in size and/or shape across its length). A constant square cross-section is preferred.

Similarly, a stud of the present invention may be made of any material suitable for its intended purpose; steel is also preferred. Thus, a stud need only be an elongated body suitable for extending through a complimentary hole in the ski and adapted to mate with a suitable fastener. It need not have any particular cross-section, nor even a constant cross-section across its length (i.e. its cross-section may vary in size and/or shape across its length). A cylinder, having a threaded exterior end its preferred.

The stud axis will be evident to a person skilled in the art from the shape of the stud itself, it is the central longitudinal axis of the stud. For instance, where the stud is cylindrical, the stud axis will be the longitudinal central axis of the cylinder. Where the stud is a quadrilateral, the stud axis will be formed by the intersection of the planes defined by opposite corners. The same is true for the rod.

The studs extend immovably away from the rod; i.e. the studs cannot pivot about their contact point with the rod. Thus, an angle described hereinabove for any one given stud for any one given skag is not variable. This immovability between the stud and the rod ensures that the skag is constantly being pushed toward the underside of the ski due to the contact between angled hole and the angled stud. This is desirable since the surface area of the ski in contact with the rod is large and can withstand higher forces when compared with the shear forces that the weld and the stud can withstand. In a conventional skag, the welding and the studs are under solely shear force because other than the tension created by the nut (and the weight of the snowmobile on the ski), in use the skag is not constantly being pushed up towards the underside surface of the ski but rather is being pushed purely rearward. In a case where the studs were pivotally connected to the rod such that the angles were variable, friction between the rod and the ground would tend to push the skag toward the rear of the ski and cause the rod to pivot with respect to the stud. The rod would drop to a lower level due to the arc created by the straightening stud, and the nut would be angled and pushed into surface, damaging the surface. The straightening or tilting of the stud within the angled hole would also cause the hole to become distorted and damaged. By having an immovable connection between the stud and the rod, the forces applied to the angled hole by the stud are broken into one force in the x direction, perpendicular to the surface of the hole, and another force in y direction parallel to the surface of the hole. Because the forces in the x direction act on the entire surface of the cylindrical hole drilled in the ski, it is very solid and any forces directed in the y direction will cause the rod to be pulled into further contact with the bottom portion of the ski. It should be understood that the force in the y direction did not exist in a conventional construction due to the lack of the angle between the studs and the rod. It should also be understood that because the force is broken up into x and y components, the shear force, i.e. the force in the x direction, to be overcome by the weld and the stud, is also reduced. Because the studs are fixed to the rod, the nuts remain at a constant angle with the surface and thus the surface and the angled holes are not damaged.

The angle between the stud and the rod opening away from the front of the rod (towards the rear of the rod) should be measured between the stud axis and the longitudinal axis of the portion of the rod rearward of the stud. Where the portion of the rod extending rearward from the contact point of a stud with the rod is curved (as opposed to straight), and the rod has no longitudinal axis at that point, the angle between the stud and the rod should be measured between the intersection of a projection of the stud axis and the tangent to the curve of the rod through (or as close as possible to) the centre of the rod (i.e. the point that would have been along the longitudinal axis if the rod had had a longitudinal axis).

The angle between the projection of the stud axis and the ground should be measured by extending the stud axis linearly until it reaches the (horizontal level) ground and then measuring the angle at the point of intersection. For this purpose, it will be necessary to know the correct orientation of the skag with respect to the ground when the skag is correctly installed on its complimentary ski and the ski is correctly installed in its intended snowmobile. This can either be determined by physical measurement or by computer-aided design.

As used herein, the terms "first" and "second" are used merely to distinguish to like elements from one another. These terms are not intended to convey any relative positioning, quality or characteristic between or among these elements (i.e. importance, size, shape). Thus, for example, in embodiments where there are two studs present, the "first" stud can be either the front stud or the rear stud (as defined consistently with the forward direction of travel); the "second" stud will simply be the other stud (i.e. the one that is not the first stud.)

Skags of the present invention are not limited to only two studs; they may have more. It such situations it is preferred that all of the studs of the skag are angled is described hereinabove; and preferably all with the same angle. Neither of these conditions is, however, necessary, and the present invention encompasses skags wherein the additional studs (i.e. the third stud, the forth stud, etc.) are not angled, or are angled but have different angles than each other and/or than the first stud and/or the second stud.

With respect to each of the aspects of the invention, preferably both the first angle and the second angle are between 45° and 75° inclusive (they need not be they same, although it is preferred that they are); and most preferably they are 65°.

Again with respect to each aspect of the present invention, preferably the first stud and the second stud are affixed to the rod of material by welding; and more preferably each of the studs is chamfered where welded to the rod of material such that a contact between each stud and the rod of material forms an ellipse when viewed from above. It is possible however, although less preferred, that the first stud, the second stud and the rod of material be integrally formed. (The manufacture of the studs and the rod themselves is possible by any number of suitable means well known to those skilled in the art, and will therefore not be described herein.)

The studs of the present invention extend away from the rod spaced-apart from one another (i.e. there is a measurable distance between them). The rod of material of the skag has a front end, a rear end and a, preferably flat, middle therebetween. It is preferred that the studs extend away from the rod each starting a point in the middle of the rod, i.e. such that there is a length of material between the end of the rod and the start of the stud. Although less preferred, it is within the scope of the present invention for one or two of the studs to extend away from the rod of material at the end or ends of the rod.

It is preferred that it be an exterior surface of each of the studs that is threaded and adapted to receive a complimentary threaded nut. It is possible however, although less preferred, that each of the studs has a bore having an interior surface, and it is the interior surface of each bore that is threaded and adapted to receive a complimentary threaded bolt. In the present context "bore" simply refers to a cavity however created, it should not be interpreted as requiring that cavity to have actually been bored as part of its creation. It should also be understood that the studs on a skag need not have the same type of threading. Differing types of threading between or among the studs, although less preferred, is still possible. Identical threading on all of the studs is most preferred, thereby rendering their compliment (e.g. a nut or a bolt depending on the threading type) usable with all of the studs.

In another aspect of the present invention there is provided a snowmobile ski, comprising: an elongated base having a topside and an underside; a keel extending away from the underside of the base; and a skag as described hereinabove on the underside of the base at the keel, with the studs of the skag extending through holes in the ski to the topside thereof, the skag being secured to the ski via a first nut in threaded engagement with the first stud and a second nut in threaded engagement with the second stud. There is also provided a snowmobile, comprising: a frame; an engine disposed on the frame; a drive track disposed below and supported by the flame and operatively connected to the engine for propulsion of the snowmobile; a seat disposed on the frame; handlebars disposed on the frame in front of the seat; at least one ski as recited hereinabove, disposed on the frame and operatively connected to the handlebars for steering the snowmobile.

In another aspect, an embodiment of the present invention provides a skag for use on an underside of a complimentary ski for a snowmobile, the skag comprising: a rod of material having a front and rear defined consistently with a forward direction of travel of the skag when the skag is secured to the ski and the ski is connected to the snowmobile; a first stud having a first stud axis, the first stud extending away from the rod of material such that when the skag is secured to the ski and the ski is connected to the snowmobile and the snowmobile is steered straight on horizontal level ground a first angle opening away from the front of the rod of material formed between a projection of the first stud axis and the ground is less than 90°; and a second stud having a second stud axis, second stud extending away from the rod of material such that when the skag is secured to the ski and the ski is connected to the snowmobile and the snowmobile is steered straight on horizontal level ground a second angle opening away from the front of the rod of material formed between a projection of the second stud axis and the ground is less than 90°, the second stud being spaced-apart from the first stud.

BRIEF DESCRIPTION OF THE DRAWINGS

Having thus generally described the nature of the present invention, reference will now be made to the accompanying drawings by way of illustration showing a preferred embodiment, in which:

FIG. 4 is a left-side elevation view of a first embodiment of a skag of the present invention;

FIG. 5 is a top plan view of the skag of the present invention;

DETAILED DESCRIPTION OF PREFERRED EMBODIMENTS

Figure 3:
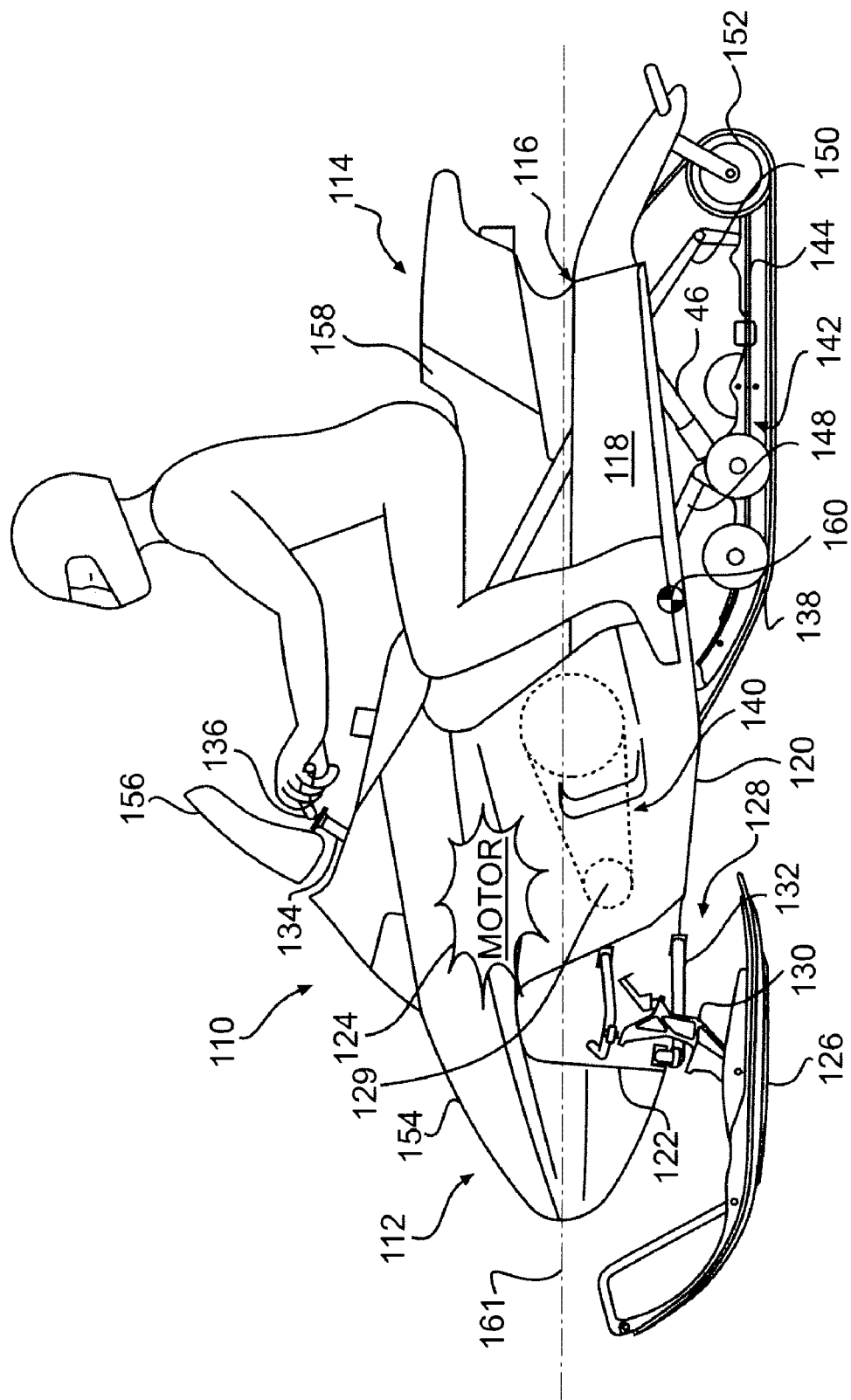
FIG. 3 is a left-side elevation view of a snowmobile incorporating a skag of the present invention.

Referring now to FIG. 3, a snowmobile incorporating an embodiment of the present invention is designated generally by reference numeral 110. Although certain aspects of the present invention are applicable in other types of vehicles, the present invention has particular utility in connection with snowmobiles.

The snowmobile 110 includes a forward portion 112 and a rearward portion 114 which are defined consistently with a forward travel direction of the vehicle. The snowmobile 110 includes a frame (also known as a chassis) 116 which normally includes a rear tunnel 118, an engine cradle 120 and a front suspension attachment assembly 122. An engine 124, which is schematically illustrated in FIG. 3, is carried by the engine cradle portion 120 of the frame 116. A ski and steering assembly (not indicated) is provided, in which two skis (of which only one is shown) 126 are positioned at the forward portion 112 of the snowmobile 110 and are attached to the front suspension attachment assembly portion 122 of the frame 116 through a front suspension assembly 128. Each front suspension assembly 128 includes a ski leg 130, supporting arms 132 and ball joints (not shown) for operatively joining its ski legs 130, supporting arms 132 and a steering column 134. The steering column 134 at its upper portion is attached to a steering device such as a handlebar 136 which is positioned forward of a rider to rotate the ski legs 130 and thus the skis 126 (on each side of the vehicle), in order to steer the vehicle.

An endless drive track 138 is positioned at the rear portion 114 of the snowmobile 110 and is disposed under tunnel 118, being connected operatively to the engine 124 through a belt transmission system 140 that is schematically illustrated by broken lines in FIG. 3. Thus, the endless drive track 138 is driven to run about a rear suspension assembly 142 for propulsion of the snowmobile 110. The rear suspension assembly 142 includes a pair of slide rails 144 in sliding contact with the endless drive track 138. The rear suspension assembly 142 also includes one or more shock absorbers 146 which may further include a coil spring (not shown) surrounding the individual shock absorbers 146. Front and rear suspension arms 148 and 150 are provided to attach the slide rails 144 to the frame 116. One or more idler wheels 152 are also provided in the rear suspension assembly 142.

At the front portion 112 of the snowmobile 110, fairings 154 enclose the engine 124 and the belt transmission system 140, thereby providing an external shell that not only protects the engine 124 and the belt transmission system 140, but can also be decorated to make the snowmobile 110 more aesthetically pleasing. Typically, the fairings 154 include a hood (not indicated) and one or more side panels which can be opened to allow access to the engine 124 and the belt transmission system 140 when this is required, for example, for inspection or maintenance of the engine 124 and/or the belt transmission system 140. In the particular snowmobile 110 shown in FIG. 3, the side panels can be opened along a vertical axis to swing away from the snowmobile 110. A windshield 156 may be connected to the fairings 154 near the front portion 112 of the snowmobile 110 or directly to the handlebar 136. The windshield 156 acts as a wind screen to lessen the force of the air on the rider while the snowmobile 110 is moving.

The engine 124 is an of internal combustion engine that is supported on the frame 116 and is located at the engine cradle portion 120. The internal construction of the engine 124 may be of any known type, however the engine 124 drives an engine output shaft 129 that rotates about a horizontally/ laterally disposed axis that extends generally transversely to a longitudinal centerline 161 extending in a front to rear direction of the snowmobile 110. The engine output shaft 129 drives the belt transmission system 140 for transmitting torque to the endless drive track 138 for propulsion of the snowmobile 110.

A straddle seat 158 is positioned atop the frame 116 and extends from the rear portion 114 of the snowmobile 110 to the fairings 154. A rear portion of the seat 158 may include a storage compartment or can be used to accommodate a passenger seat (not indicated). Two footrests (one shown) 160 are positioned on opposite sides of the snowmobile 110 below the seat 158 to accommodate the driver's feet.

Snowmobile 110 has skis 126 having skags of the present invention. FIGS. 4 and 5 show the skag 162. Skag 162 has a rod 163 having a longitudinal axis 164 which is parallel to the forward direction of travel of the skag 162 when the skag 162 is properly installed on a complimentary ski (not shown in those figures), indicated by the arrow 166, of the skag 162. The front 168 and the rear 170 of the rod 163 are typically bent upward so that the ends do not hook into the ground when the skag 162 is in use. A flat middle 169 of the skag 162, from which the studs 174, 176 extend, is between the front 168 and the rear 170. The rod 163 is made steel, and has a square cross-section.

Carbides 172 are fixed to the bottom of the rod 163 to further enhance the steering capabilities of the skag 162. (Although it is preferable to place carbides on the bottom of the rod, by no means is the present invention limited to a skag having carbides.)

A front stud 174 and a rear stud 176 extend upwardly from the rod 163 at angles θ and γ respectively which open away from the front 168 of the skag 162 and are each 65°. The studs 174 and 176 are circular in cross-section; the exterior surfaces thereof are threaded with threads 178 and receive a nut 190. Each of the studs 174, 176 has a stud axis 180. (In the description of this embodiment the studs themselves have been given different reference numbers (to separately identify them) but their various portions and features have not (simply for ease of reference). This was not intended to limit the invention.)

Each stud 174, 176 has a free portion 182 and a contact portion 184. The free portion 182 is adapted to receive a nut 190 (or other threaded fastening device) (shown in later figures to co-operate with the stud 174, 176 and fasten the skag 162 to a snowmobile ski. The contact portion 184 is fixed to the rod 163 by welding. The contact portion 184 is chamfered at an angle similar to angles θ and γ for the front stud 174 or rear stud 176 respectively to create an elliptical contact perimeter 186 between the respective stud 174, 176 and the rod 163.

Figure 6:
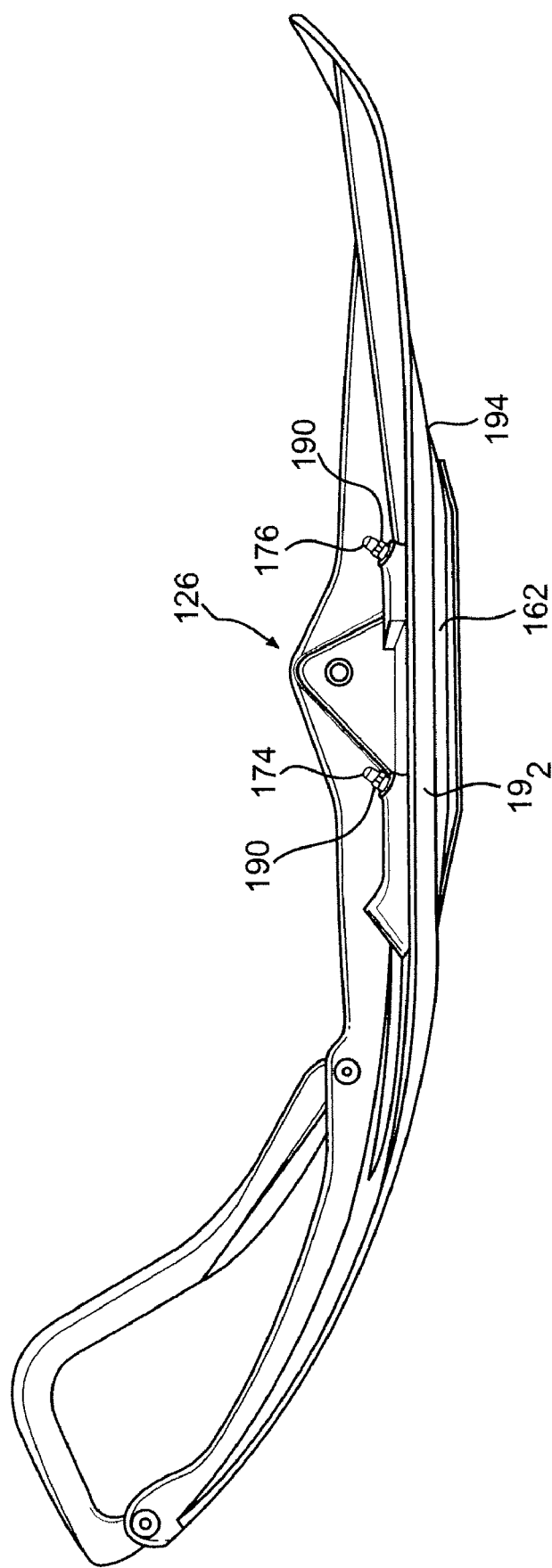
FIG. 6 is a left-side elevation view of a snowmobile ski equipped with the skag of the present invention.
Figure 7:
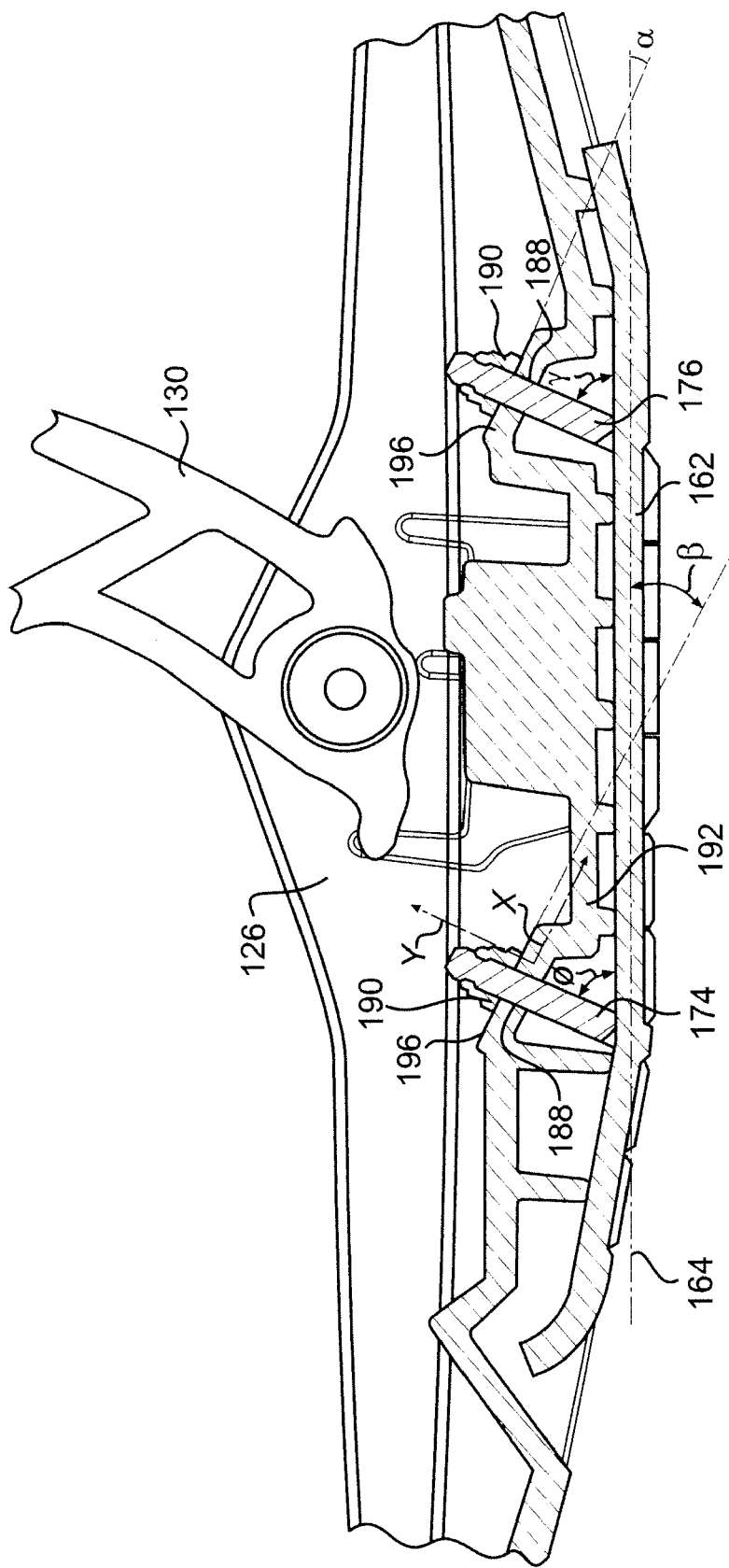
FIG. 7 is a partial cross section taken along the longitudinal axis of the skag, of a snowmobile ski equipped with the skag of the present invention.

FIGS. 6 and 7 show a side view of a ski 126 equipped with the skag 162 of the present invention. The skag 162 is placed on a bottom surface 194 of a keel 192 of the ski 126 such that studs 174, 176 protrude through holes 188 in the keel 192, best seen in FIG. 7. Nuts 190 are threaded to the front and rear studs 174, 176 to sandwich the ski 126 between the skag 162; the nuts 190 thus secure the skag 162 to the ski 126.

As would be recognized by a person skilled in the art, the forces applied to the ski 126 by the ski leg 130 during forward movement of the snowmobile and the forces applied to the skag 162 from the contact with the ground 50 are always in the opposite direction due to the friction between the skag 162 and the ground 50 that it contacts. In the forward operation of the snowmobile, the skag 162 is constantly being "pushed" towards the rear of the ski 126, and thus the studs 174, 176 and the welds between the studs 174, 176 and the rod 163 must resist bending and shear in securing the skag 162 to the ski 126. Having the studs 174, 176 angled and fixed with the rod offers several advantages of dealing with these stresses created as described hereinabove.

As can also be seen in FIG. 7, the nut contact surface 196 of ski 126 is angled with respect to the longitudinal axis 164 by angles β and δ for the front stud 174 and the rear stud 176 respectively, which, in this case, is equal to 90°−θ and 90°−γ respectively. It would be appreciated that in order to have the nut 190, or the head of a bolt (not shown), evenly contact surface 196, it is desirable to have such a relationship between θ and β and between γ and δ.

In this embodiment, having the studs 174, 176 angled rearwardly with respect to the rod 163, also provides more access to the nuts 190 behind a ski leg 130. Because the ski leg 130 is constructed to be angled toward the rear, having the studs angled rearward provides better access to the rear nuts with certain tools than if the studs were not angled. The angled studs also prevent a user from installing the skags on the bottom of a ski in the reverse orientation as, the studs would not pass through the angled holes in the bottom of the ski.

Figure 8:
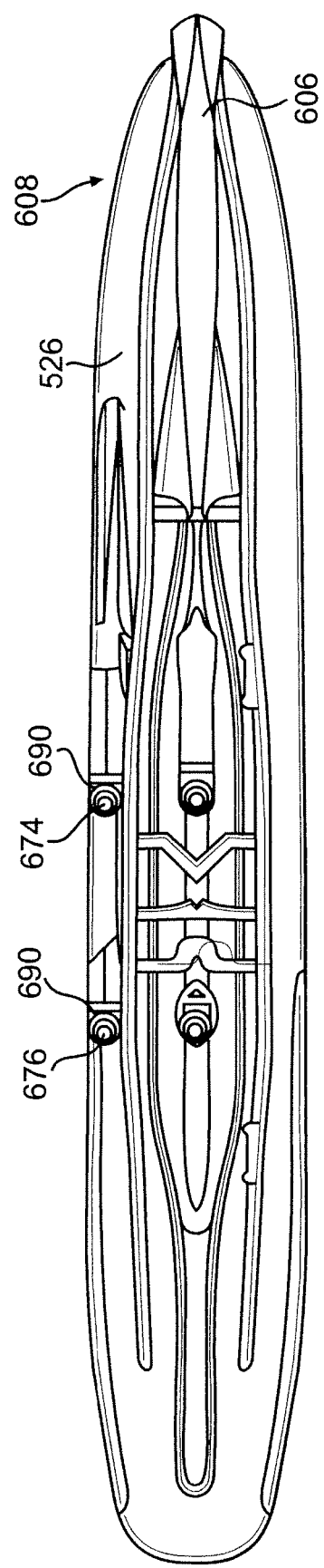
FIG. 8 is a top plan view of a snowmobile ski equipped with the skag of the present invention.
Figure 9:
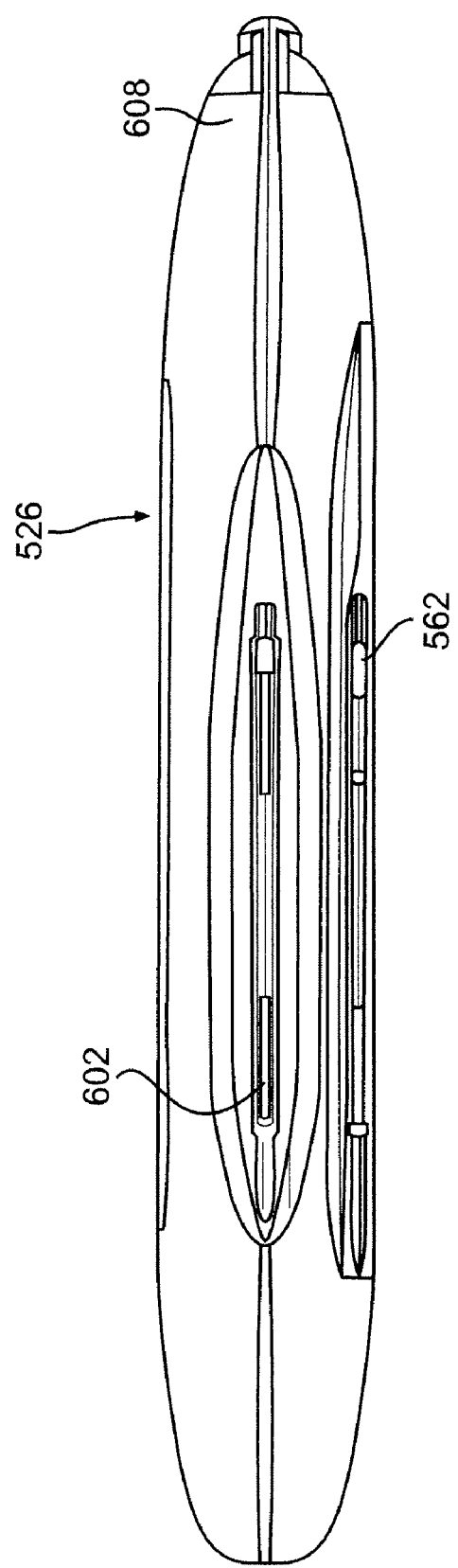
FIG. 9 is a bottom plan view of the snowmobile ski equipped with the skag of the present invention.
Figure 10:
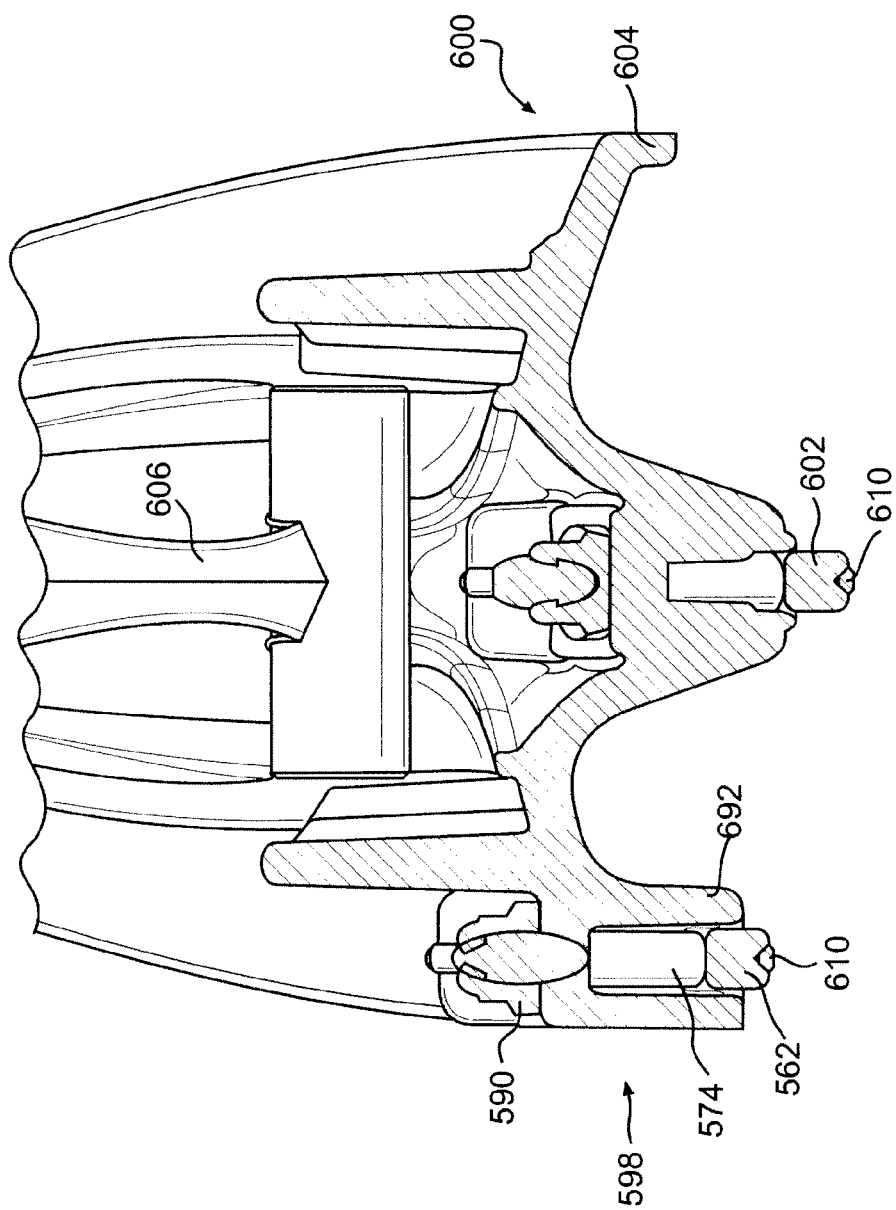
FIG. 10 is a cross section taken perpendicular to the longitudinal axis of the skag, of a snowmobile ski equipped with the skag of the present invention.

FIGS. 8, 9 and 10 show top and bottom plan views and a cross-sectional view respectively of a ski 526 equipped with two skags 562, 602 of the present invention. (Skis may have single or multiple skags.) Ski 526 has skag 562 attached at a first side 598 of the ski 526 and a second skag 602 attached between the first side 598 and a second side 600, down the center, of the ski 526. Best seen in FIG. 10, the second side 600 of the ski 526 includes a lip 604 extending downward therefrom. A handle 606 is attached at the front portion 608 of the ski 526 to provide a grip for lifting ski 526 when needed. Also seen in FIG. 10, skags 562 and 602 include carbides 610 fixed to the bottom thereof to further enhance the turning capabilities of the ski as described above.

Figure 11:
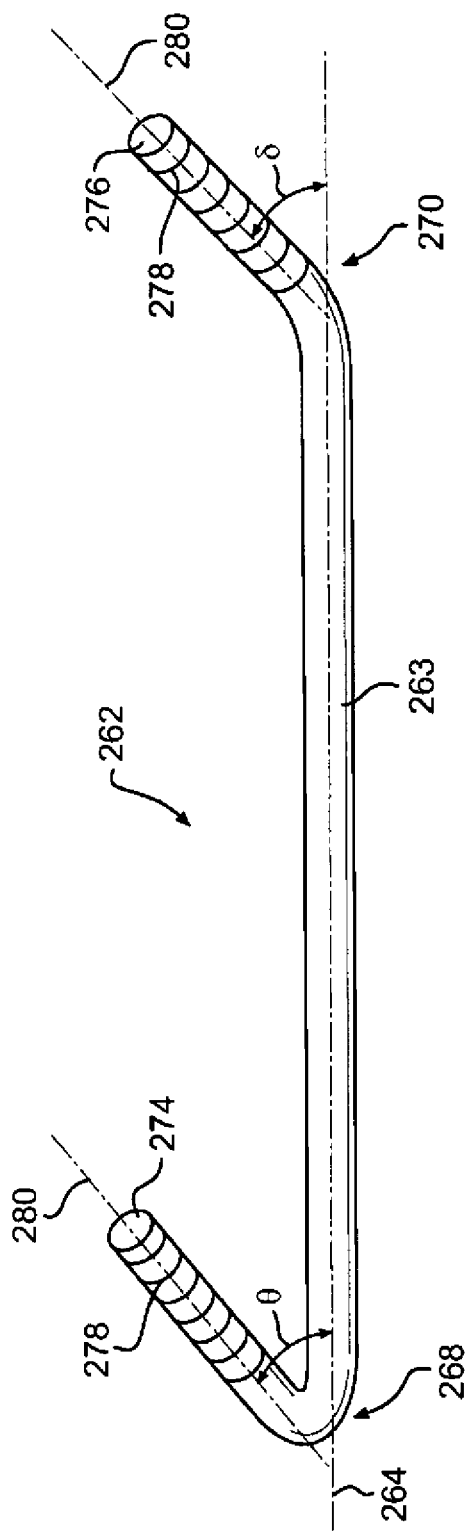
FIG. 11 is a left-side elevation view of a second embodiment of a skag of the present invention.
Figure 12:
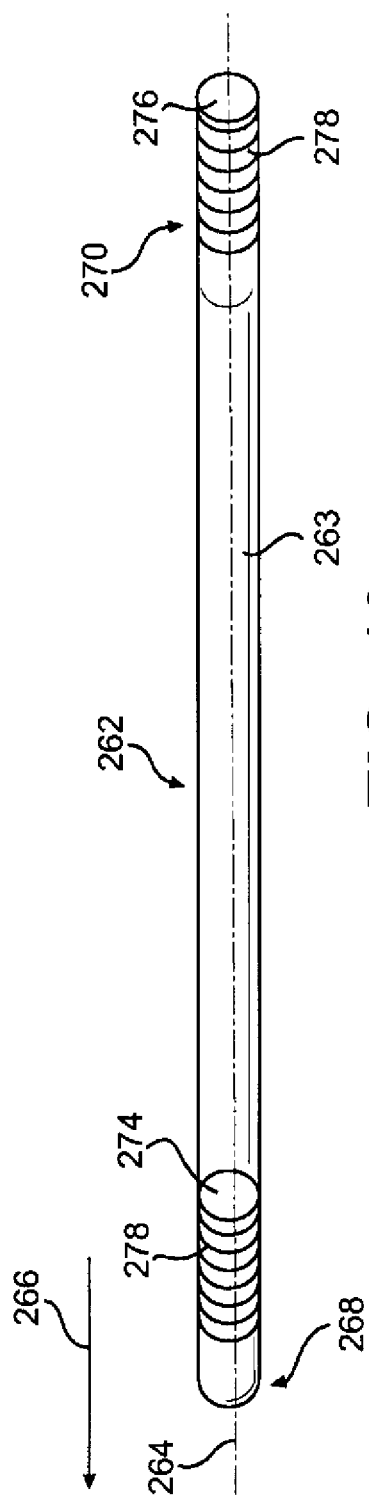
FIG. 12 is a top plan view of the skag of FIG. 11.
Figure 13:
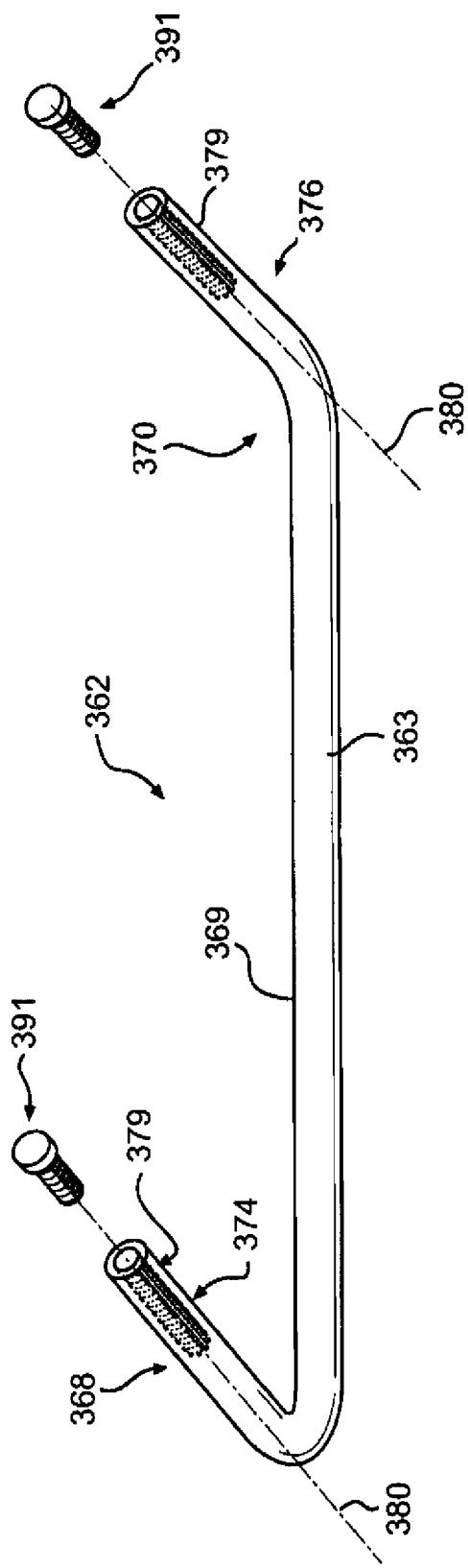
Figure 15:
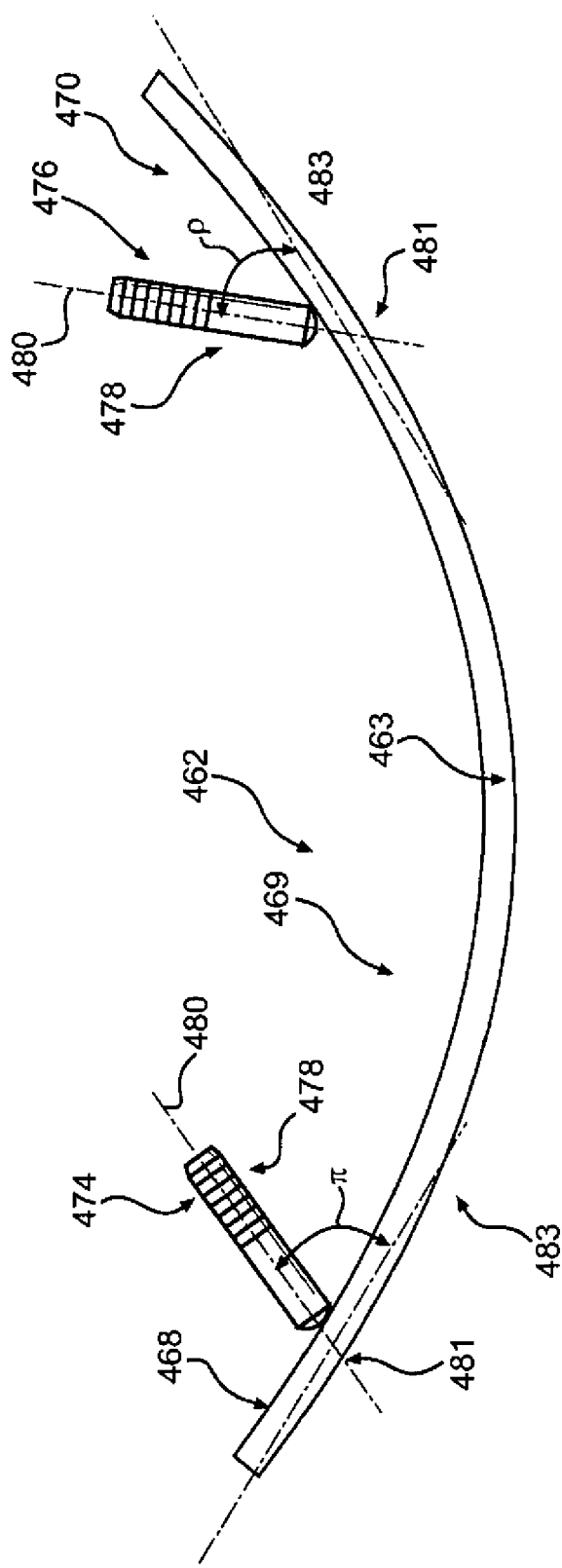

FIGS. 11 and 12 show a second embodiment of the present invention. Skag 262 includes a rod 263 having two angled ends 268, 270. The two ends 268, 270 are threaded with threads 278 to form studs 274 and 276. As with studs 174, 176, the ends 268, 270 forming the studs 274 and 276 are angled in a direction opposite to that of the forward travel direction 266 of the skag 262. The studs 274, 276 define a thread axis 280 which is angled with the longitudinal axis 264 of the skag 262 at the preferred angles θ and γ for studs 274 and 276 respectively. Although similar to skag 162, skag 262 no longer requires that the studs be welded to the rod but rather the ends 270, 268 of the rod have been simply bent and threaded to form the studs 274, 276. Direct molding in this shape would have also possible. The skag 262 benefits from some of the same advantages discussed above with respect to skag 162 due to its rearward angled studs 274, 276.

Figure 13:
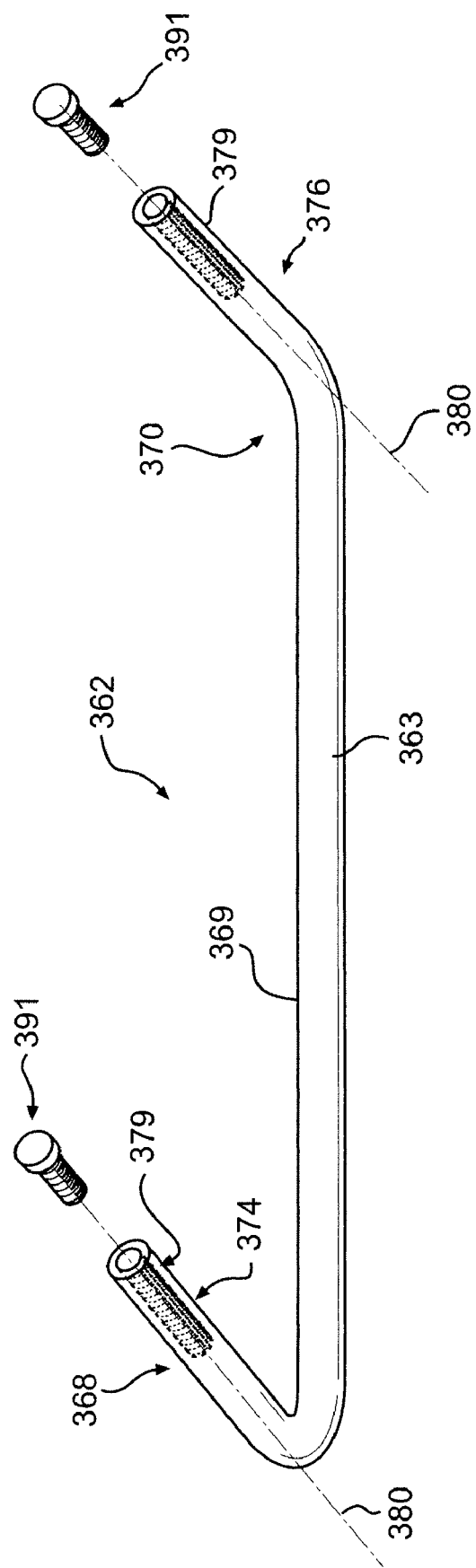
FIG. 13 is a left-side elevation view of a third embodiment of a skag of the present invention.

FIG. 13 shows a third embodiment of the present invention. Skag 362 includes a rod 363 having two angled ends 368, 370 forming studs 374, 376. Studs 374, 376 each have a threaded bore 379 therein to receive a complimentary threaded nut 391. Each stud 374, 376 has a stud axis 380 which is co-axial with a longitudinal axis of the bore 391. (An embodiment where they are not co-axial is also possible.) The bores 391 are physically bored into the studs 374, 376, however they could be otherwise formed by any number of methods known to persons skilled in the art.

Figure 14:
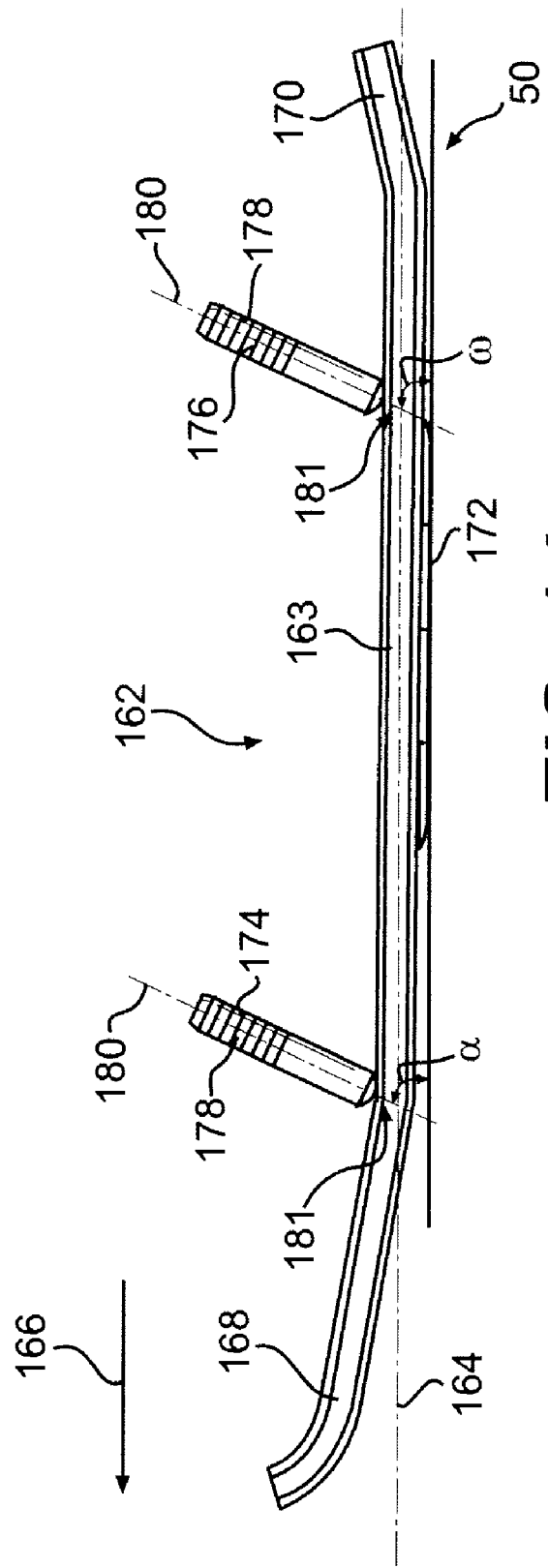
FIG. 14 is a second left-side elevation view of a first embodiment of a skag of the present invention.

FIG. 14 shows a skag of the embodiment of FIG. 4 wherein the angle α between projection 181 of the stud axis 180 of stud 174 and the ground 50, and the angle ω between the projection 181 of the stud axis 180 of stud 176, are shown. Both angles are 65°.

Figure 15:
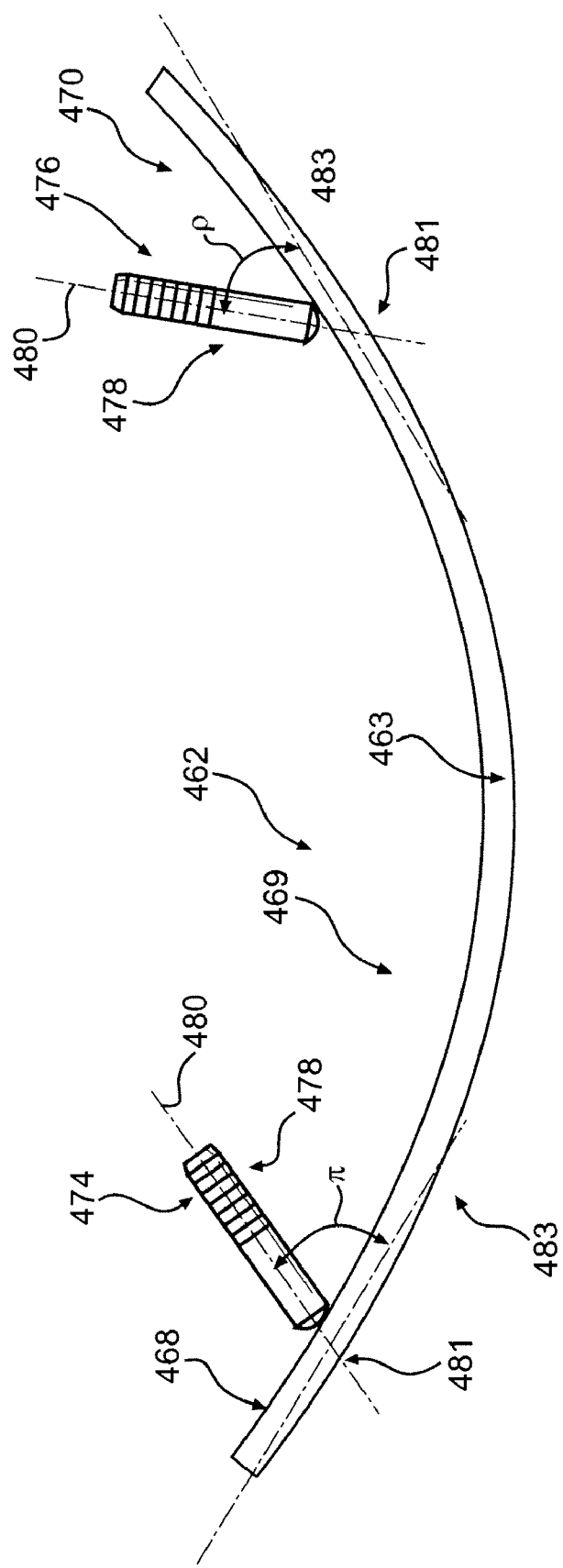
FIG. 15 is a left-side elevation view of a fourth embodiment of a skag of the present invention.
Figure 3:
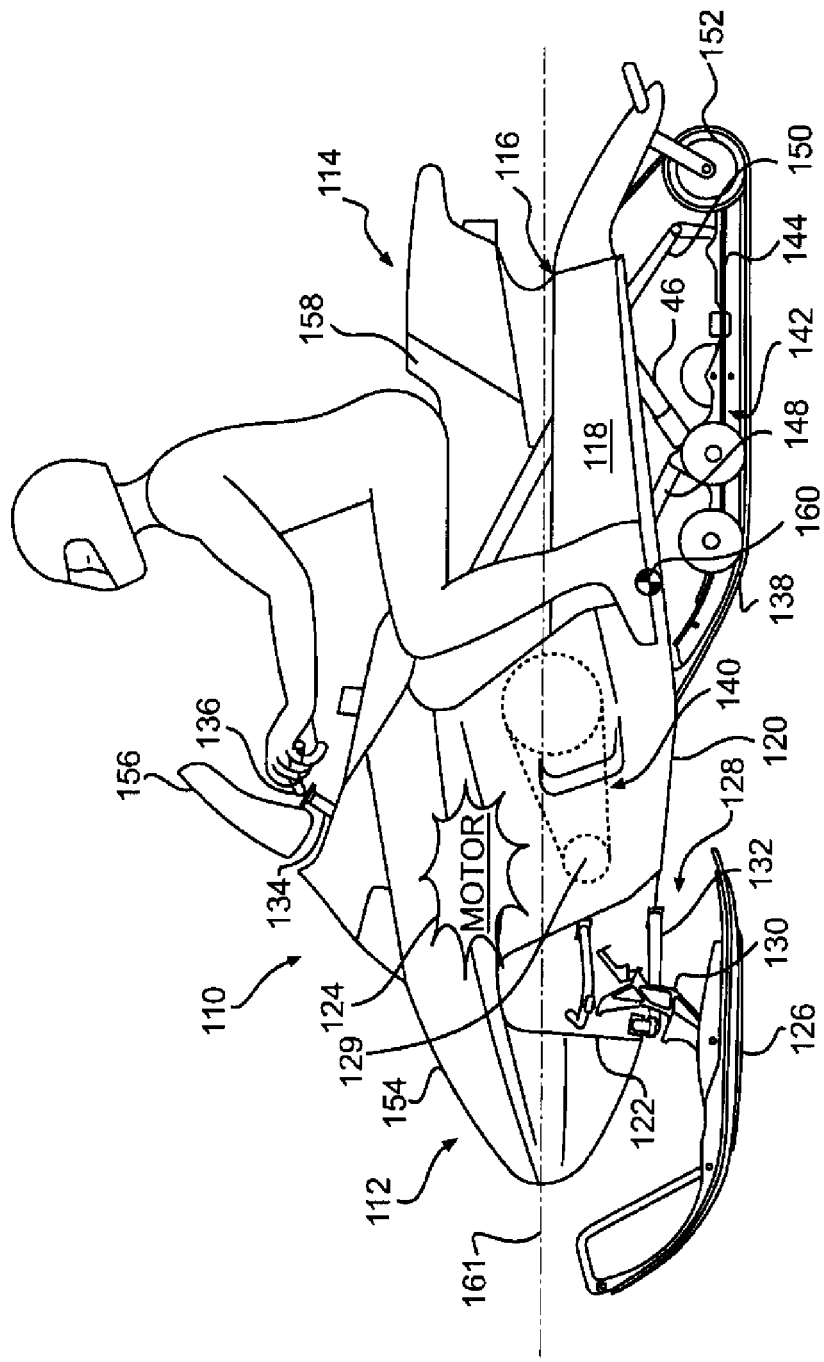
Figure 6:
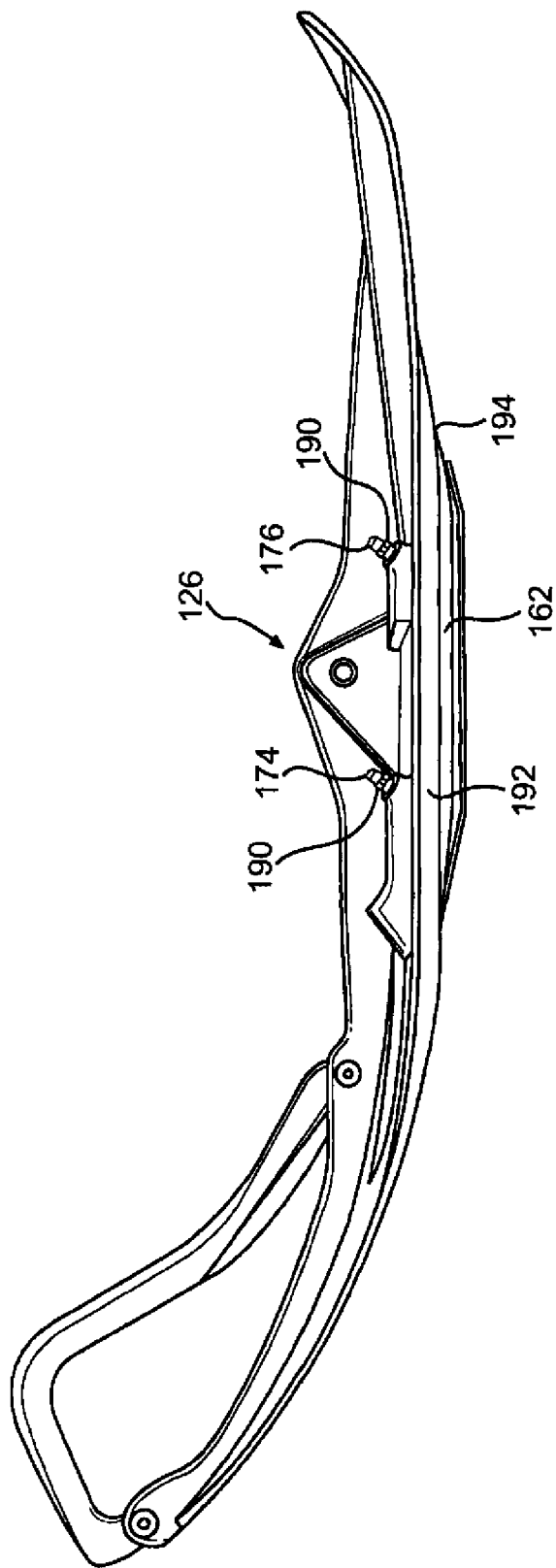
Figure 7:
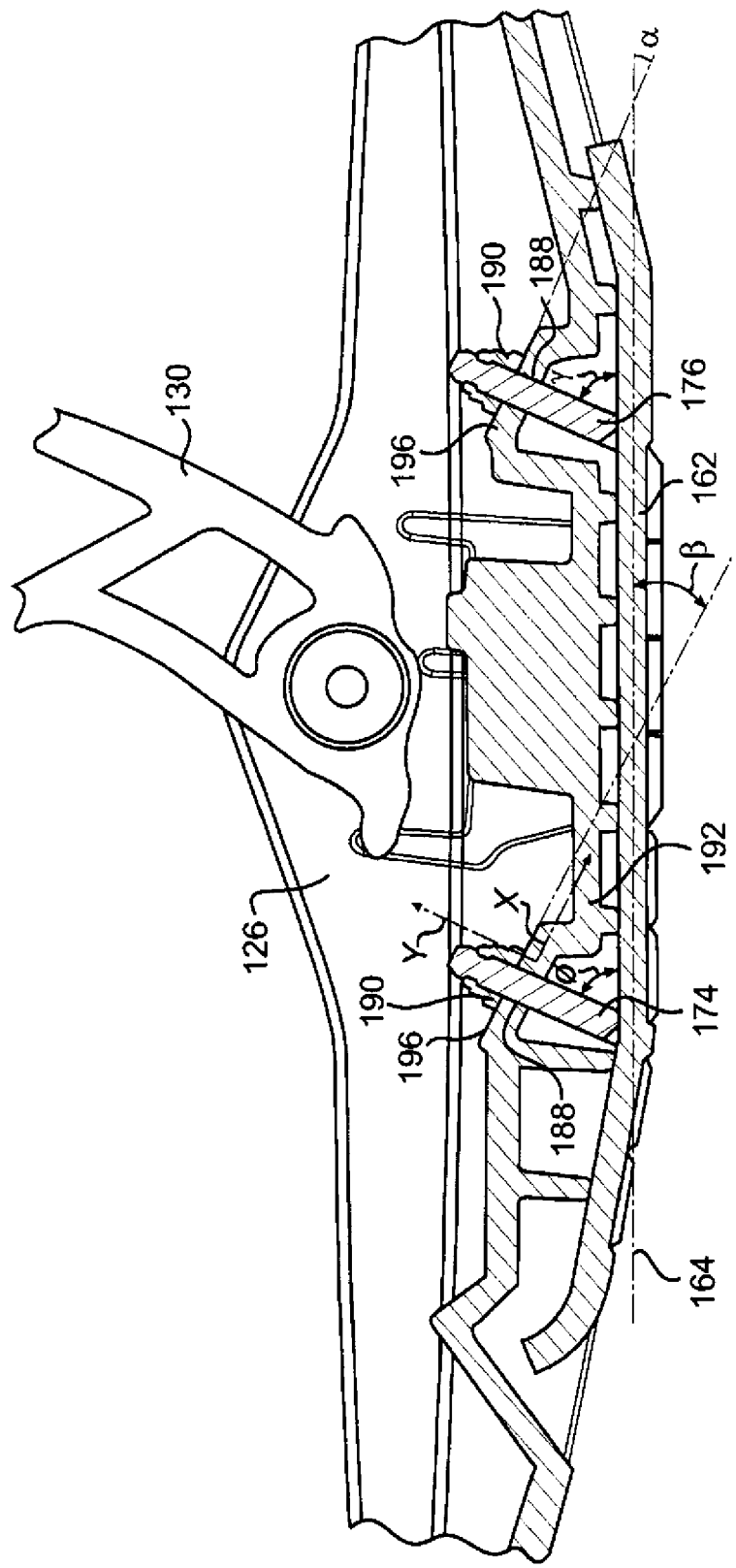
Figure 8:
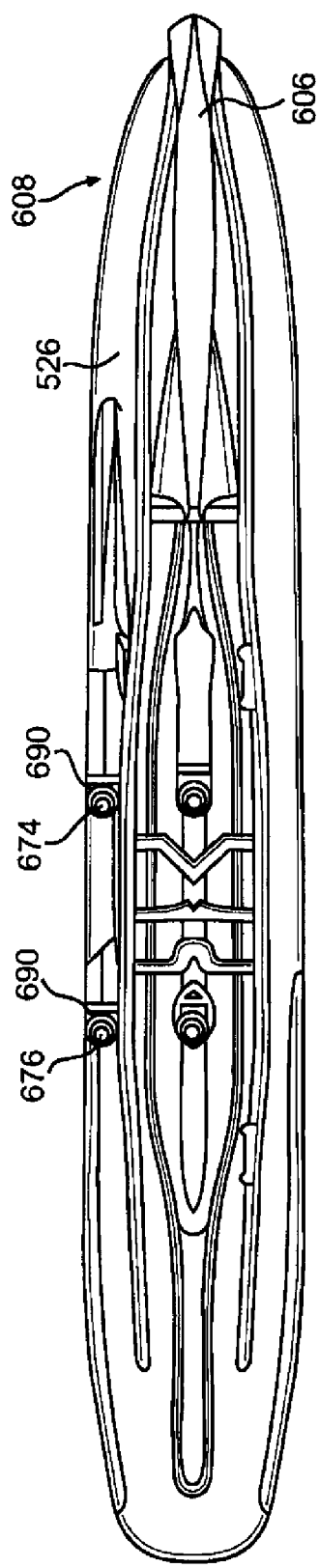
Figure 9:
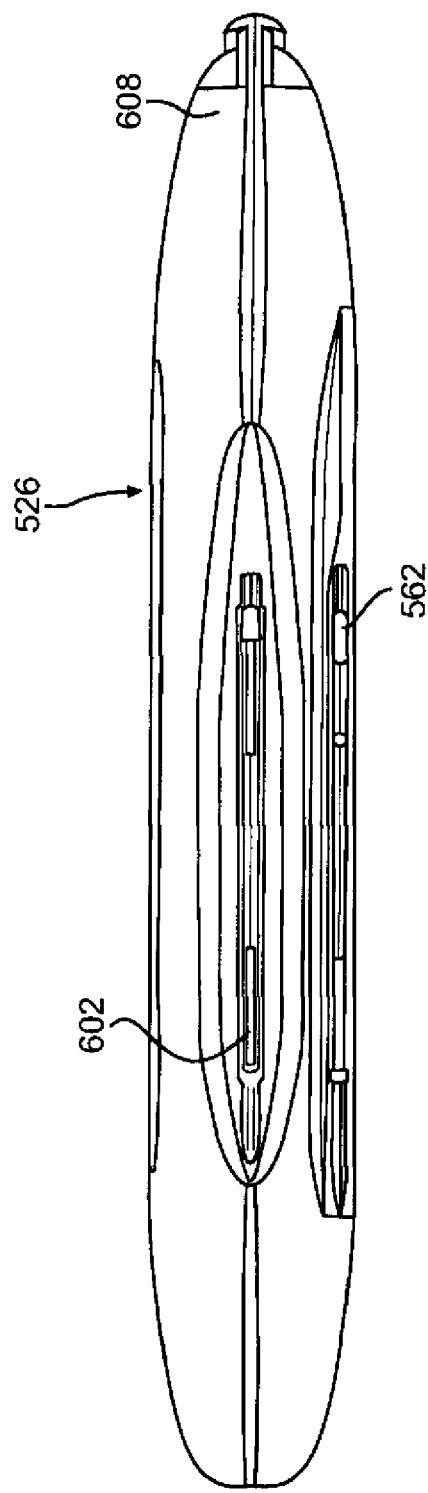
Figure 10:
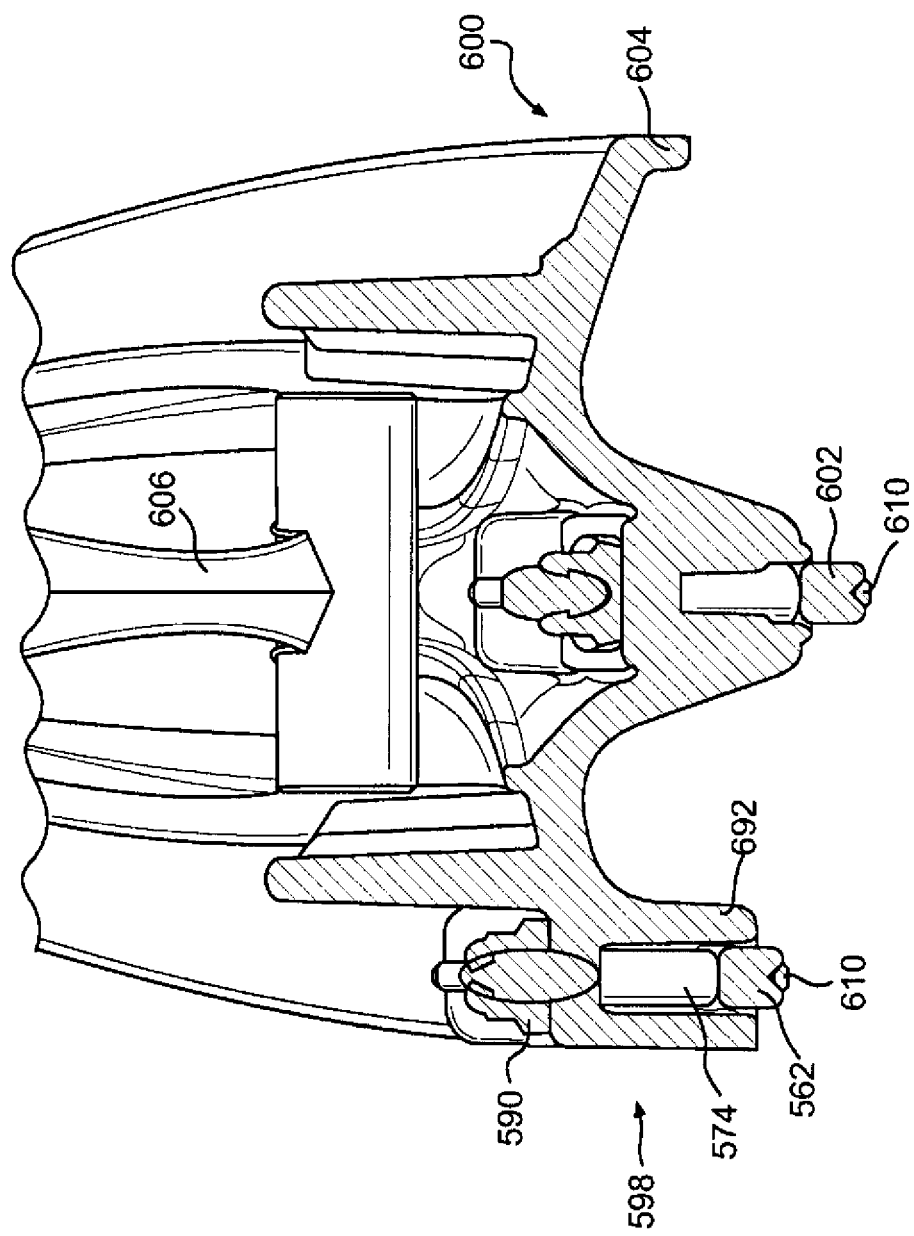

FIG. 15 shows a fourth embodiment of the present invention. Skag 462 has a curved rod 463 having no longitudinal axis. The front 468 and the rear 470 of the rod 463 are curved upward. A curved middle 469 of the skag 462, from which the studs 474, 476 extend, is between the front 468 and the rear 470. The rod 463 is made steel, and has a square cross-section. As skag 462 has no longitudinal axis, the angles π and ρ are measured between the projection 481 of the stud axis 480 and the tangent 483 to the curve of the rod through (or as close as possible to) the centre of the rod.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

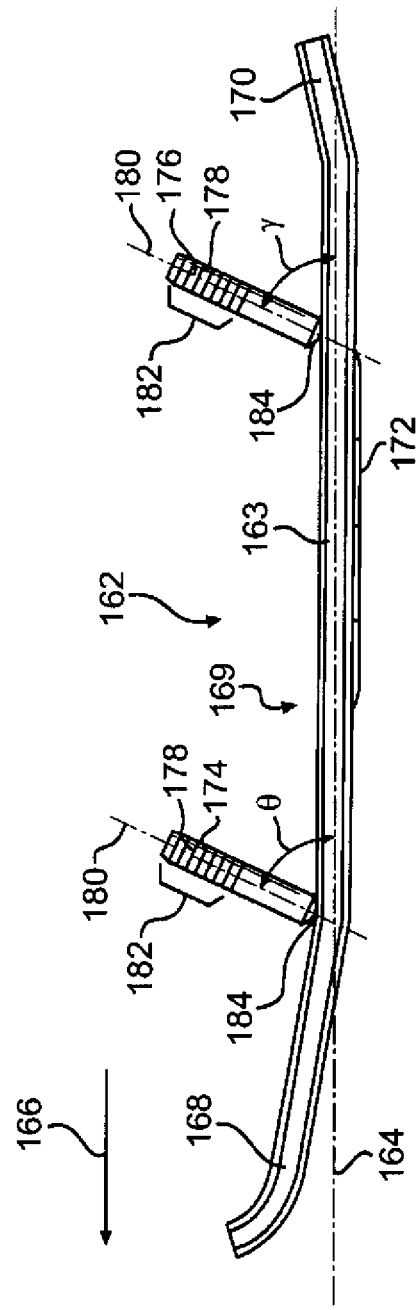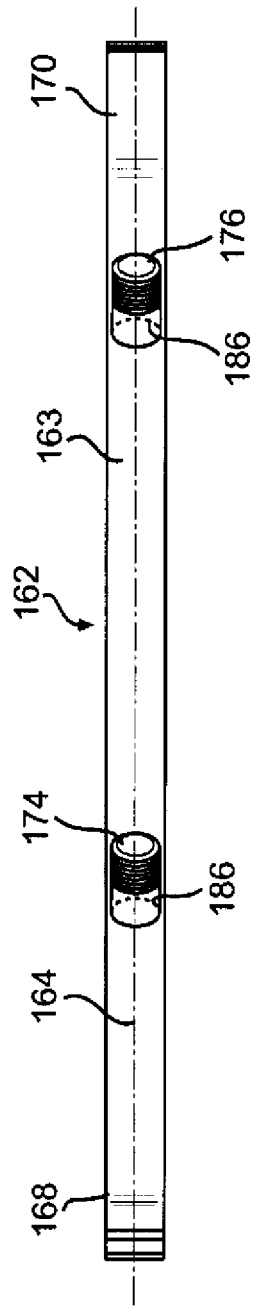

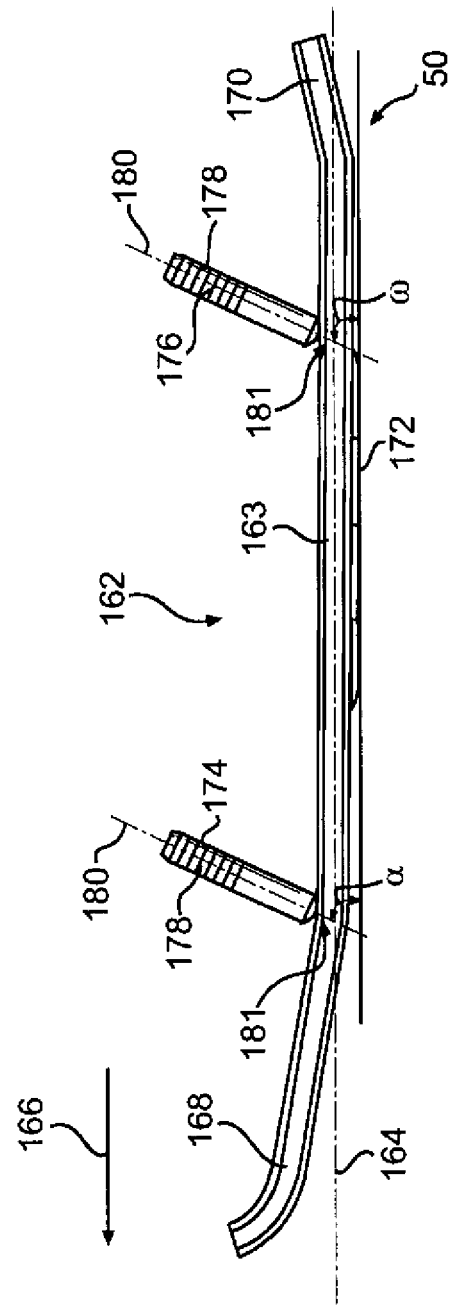

We claim:

1. A skag for use on an underside of a complementary ski for a snowmobile, the skag comprising:
    a rod of material having a front and rear defined consistently with a forward direction of travel of the skag when the skag is secured to the ski and the ski is connected to the snowmobile;
    a first stud immovably extending away from the rod of material at a first angle opening away from the front of the rod of material, the first angle being less than 90°, the first stud having threads for securing the skag to the ski; and
    a second stud immovably extending away from the rod of material, spaced-apart from the first stud, at a second angle opening away from the front of the rod of material, the second angle being less than 90°, the second stud having threads for securing the skag to the ski.

2. The skag of claim 1, wherein both the first angle and the second angle are between 45° and 75° inclusive.

3. The skag of claim 2, wherein both the first angle and the second angle are 65°.

4. The skag of claim 1, wherein the first stud, the second stud and the rod of material are integrally formed.

5. The skag of claim 1, wherein the first stud and the second stud are affixed to the rod of material by welding.

6. The skag of claim 5, wherein each of the studs is chamfered where welded to the rod of material such that a contact between each stud and the rod of material forms an ellipse when viewed from above.

7. The skag of claim 1, wherein the rod of material has a front end and a rear end and the studs extend away from the rod of material at the ends thereof.

8. The skag of claim 1, wherein the rod of material has a front end, a rear end and a middle therebetween, and the studs extend away from the rod of material from the middle.

9. The skag of claim 8, wherein the middle of the rod of material is flat.

10. The skag of claim 1, wherein it is an exterior surface of each of the studs that is threaded and adapted to receive a complementary threaded nut.

11. The skag of claim 1, wherein each of the studs has a bore having an interior surface, and it is the interior surface of each bore that is threaded and adapted to receive a complementary threaded bolt.

12. The skag of claim 1, wherein:
    the material is metal;
    both the first angle and the second angle are between 45° and 75° inclusive;
    the first stud and the second stud are both welded to the rod; and
    it is an exterior surface of each of the studs that is threaded and adapted to receive a complementary nut.

13. A snowmobile ski, comprising:
an elongated base having a topside and an underside;
a keel extending away from the underside of the base; and
the skag of claim 12 on the underside of the base at the keel, with the studs of the skag extending through holes in the ski to the topside thereof, the skag being secured to the ski via a first nut in threaded engagement with the first stud and a second nut in threaded engagement with the second stud.

14. A snowmobile, comprising:
a frame;
an engine disposed on the frame;
a drive track disposed below and supported by the frame and operatively connected to the engine for propulsion of the snowmobile;
a seat disposed on the frame;
handlebars disposed on the frame in front of the seat;
at least one ski as recited in claim 13, disposed on the frame and operatively connected to the handlebars for steering the snowmobile.

15. A skag for use on an underside of a complementary ski for a snowmobile, the skag comprising:
a rod of material having a front and rear defined consistently with a forward direction of travel of the skag when the skag is secured to the ski and the ski is connected to the snowmobile;
a first stud having a first stud axis, the first stud immovably extending away from the rod of material such that when the skag is secured to the ski and the ski is connected to the snowmobile and the snowmobile is steered straight on horizontal level ground a first angle opening towards the rear of the rod of material formed between a projection of the first stud axis and the ground is less than 90°; and
a second stud having a second stud axis, second stud immovably extending away from the rod of material such that when the skag is secured to the ski and the ski is connected to the snowmobile and the snowmobile is steered straight on horizontal level ground a second angle opening towards the rear of the rod of material formed between a projection of the second stud axis and the ground is less than 90°, the second stud being spaced-apart from the first stud.

16. The skag of claim 15, wherein both the first angle and the second angle are between 45° and 75° inclusive.

17. The skag of claim 16, wherein both the first angle and the second angle are 65°.

18. The skag of claim 15, wherein the first stud, the second stud and the rod of material are integrally formed.

19. The skag of claim 15, wherein the first stud and the second stud are affixed to the rod of material by welding.

20. The skag of claim 19, wherein each of the studs is chamfered where welded to the rod of material such that a contact between each stud and the rod of material forms an ellipse when viewed from above.

21. The skag of claim 15, wherein the rod of material has a front end and a rear end and the studs extend away from the rod of material at the ends thereof.

22. The skag of claim 15, wherein the rod of material has a front end, a rear end and a middle therebetween, and the studs extend away from the rod of material from the middle.

23. The skag of claim 22, wherein the middle of the rod of material is flat.

24. The skag of claim 15, wherein it is an exterior surface of each of the studs that is threaded and adapted to receive a complementary threaded nut.

25. The skag of claim 15, wherein each of the studs has a bore having an interior surface, and it is the interior surface of each bore that is threaded and adapted to receive a complementary threaded bolt.

26. The skag of claim 15, wherein:
the material is metal;
both the first angle and the second angle are between 45° and 75° inclusive;
the first stud and the second stud are both welded to the rod; and
it is an exterior surface of each of the studs that is threaded and adapted to receive a complementary nut.

27. A snowmobile ski, comprising:
an elongated base having a topside and an underside;
a keel extending away from the underside of the base; and
the skag of claim 26 on the underside of the base at the keel, with the studs of the skag extending through holes in the ski to the topside thereof, the skag being secured to the ski via a first nut in threaded engagement with the first stud and a second nut in threaded engagement with the second stud.

28. A snowmobile, comprising:
a frame;
an engine disposed on the frame;
a drive track disposed below and supported by the frame and operatively connected to the engine for propulsion of the snowmobile;
a seat disposed on the frame;
handlebars disposed on the frame in front of the seat; and
at least one ski as recited in claim 27, disposed on the frame and operatively connected to the handlebars for steering the snowmobile.

* * * * *

UNITED STATES PATENT AND TRADEMARK OFFICE
CERTIFICATE OF CORRECTION

PATENT NO. : 7,413,198 B2
APPLICATION NO. : 11/349256
DATED : August 19, 2008
INVENTOR(S) : Rene Lemieux, Yvon Bedard and Bertrand Mallette It is certified that error appears in the above-identified patent and that said Letters Patent is hereby corrected as shown below:

Please delete the old drawing figs 1-12 that were illustrated. The new formal drawings, Title page and Figs. 1-12 that are attached here should read as illustrated.

Signed and Sealed this

Fourth Day of August, 2009

JOHN DOLL
*Acting Director of the United States Patent and Trademark Office*

United States Patent
Lemieux et al.

(12) United States Patent
(10) Patent No.: US 7,413,198 B2
(45) Date of Patent: Aug. 19, 2008

(54) SKAG HAVING ANGLED ATTACHMENT STUDS

(75) Inventors: Rene Lemieux, Granby (CA); Yvon Bedard, Orford (CA); Bertrand Mallette, Rock-Forest (CA)

(73) Assignee: Bombardier Recreational Products Inc., Valcourt (CA)

(*) Notice: Subject to any disclaimer, the term of this patent is extended or adjusted under 35 U.S.C. 154(b) by 66 days.

(21) Appl. No.: 11/349,256

(22) Filed: Feb. 8, 2006

(65) Prior Publication Data
US 2006/0175777 A1 Aug. 10, 2006

Related U.S. Application Data

(60) Provisional application No. 60/651,144, filed on Feb. 8, 2005.

(51) Int. Cl.
B62B 13/00 (2006.01)

(52) U.S. Cl. ............... 280/28; 280/21.1; 280/609

(58) Field of Classification Search ............... 180/182, 180/183, 184, 185, 186, 187, 188, 189, 190; 280/21.1, 22, 25, 26, 27, 28, 29, 601, 606, 280/608, 609
See application file for complete search history.

(56) References Cited

U.S. PATENT DOCUMENTS

| | | | |
|---|---|---|---|
| 2,150,964 A | 3/1939 | Dornseif | |
| 3,082,444 A | 3/1963 | Estes | |
| 3,545,560 A | 12/1970 | Fox | |
| 3,732,939 A | 5/1973 | Samson | |
| 3,739,458 A | 6/1973 | Reedy et al. | |
| 3,765,695 A | 10/1973 | McGregor | |
| 3,773,343 A | 11/1973 | Ambrose | |
| 3,857,578 A | 12/1974 | Alton | |
| 3,964,561 A | 6/1976 | Lunzer et al. | |
| 4,163,565 A | 8/1979 | Weber | |
| 5,205,690 A * | 4/1993 | Roth | 411/82 |
| 5,222,749 A * | 6/1993 | Bergstrom | 280/28 |
| 5,344,168 A | 9/1994 | Olson | |
| 5,443,278 A | 8/1995 | Berto | |
| 5,599,030 A | 2/1997 | Campbell et al. | |

(Continued)

FOREIGN PATENT DOCUMENTS

EP 1375335 1/2004

OTHER PUBLICATIONS

A Prior Art Skag Sold by International Engineering & Manufacturing Inc. of Hope, Michigan under the Trademark of Woody's®.

*Primary Examiner*—Christopher Ellis
*Assistant Examiner*—John D Walters
(74) *Attorney, Agent, or Firm*—Osler, Hoskin & Harcourt LLP

(57) ABSTRACT

A skag having a rod/elongated rod and rearwardly-angled threaded studs upwardly-extending immovably from the rod. The skag adapted to be connected to the bottom of a snowmobile ski to enhance the steering capabilities the snowmobile ski. The studs being angled with respect to a longitudinal axis of the skag in a direction opposite to that of the forward travel direction of the skag to decrease the shear stress on the weld fixing the stud to the rod and providing a security against installing the skags in the wrong orientation on the bottom of the ski.

28 Claims, 12 Drawing Sheets

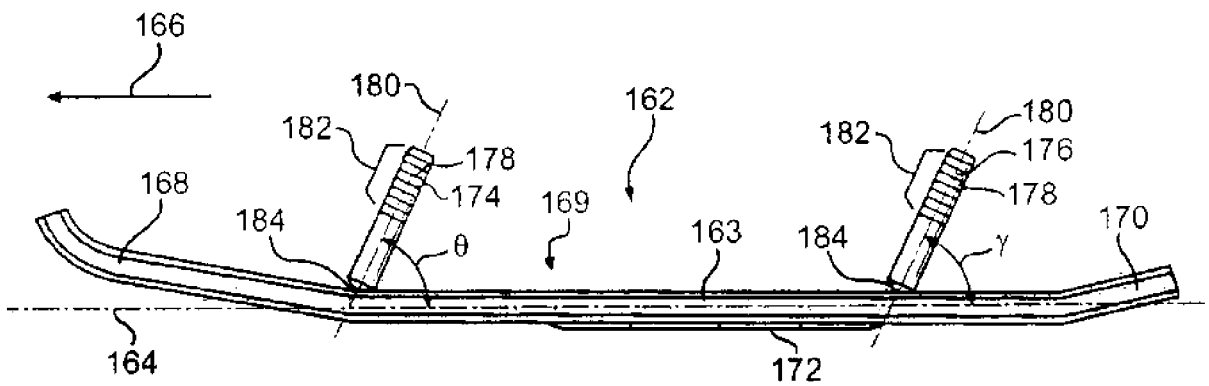

Figure 1:
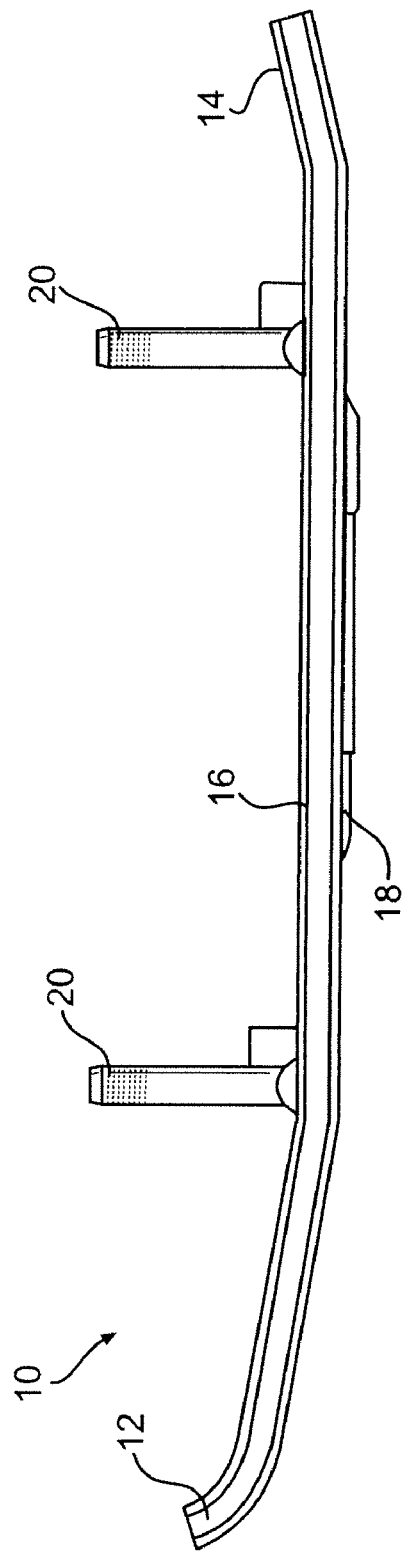
FIG. 1 is a left-side elevation view of a conventional prior art skag.
Figure 2:
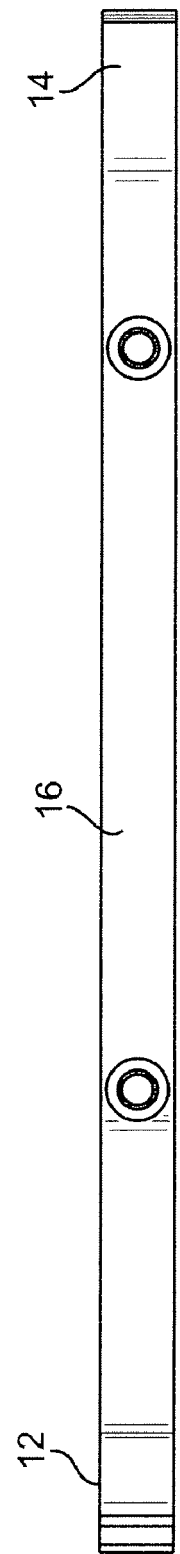
FIG. 2 is a top plan view of the conventional skag of FIG. 1.

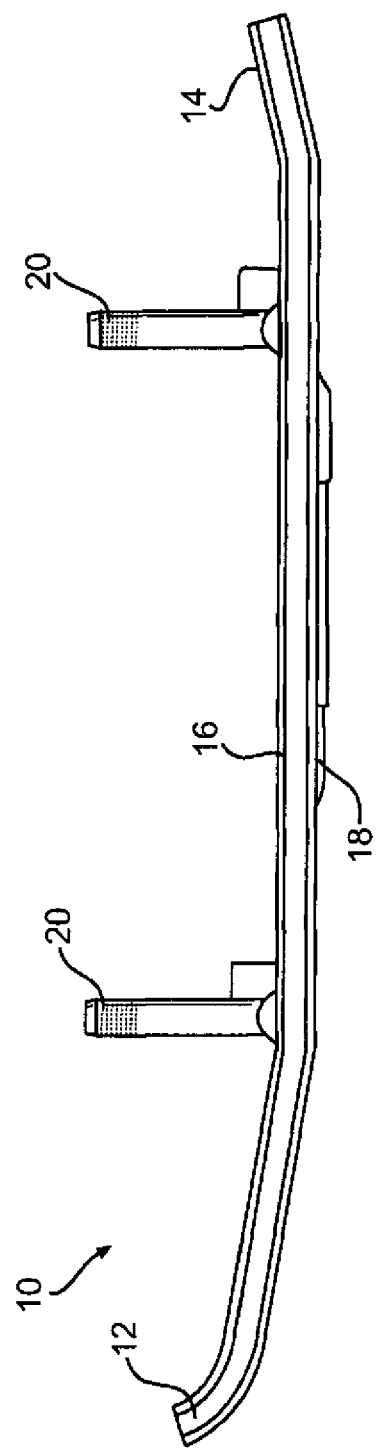
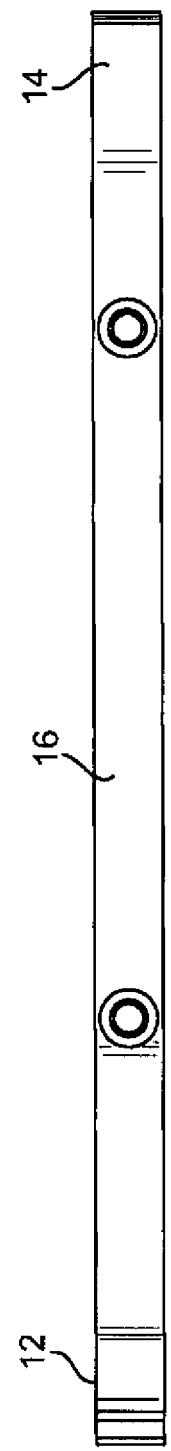
FIG. 1
*PRIOR ART*
FIG. 2
*PRIOR ART*